(12) United States Patent  
Couzin

(10) Patent No.: US 7,959,427 B2
(45) Date of Patent: Jun. 14, 2011

(54) TOOL FOR MAKING A CUBE CORNER RETROREFLECTOR WITH LIMITED RANGE

(75) Inventor: Dennis I. Couzin, Evanston, IL (US)

(73) Assignee: Avery Dennison Corporation, Pasadena, CA (US)

( * ) Notice: Subject to any disclaimer, the term of this patent is extended or adjusted under 35 U.S.C. 154(b) by 529 days.

(21) Appl. No.: 12/040,722

(22) Filed: Feb. 29, 2008

(65) Prior Publication Data

US 2008/0211120 A1    Sep. 4, 2008

Related U.S. Application Data

(62) Division of application No. 11/018,828, filed on Dec. 21, 2004, now Pat. No. 7,370,981.

(60) Provisional application No. 60/532,496, filed on Dec. 24, 2003.

(51) Int. Cl.
*B29D 11/00* (2006.01)
(52) U.S. Cl. ........... 425/175; 264/1.9; 264/2.5; 425/808
(58) Field of Classification Search ............... 264/1.1, 264/1.9, 2.5; 425/808, 175, 177
See application file for complete search history.

(56) References Cited

U.S. PATENT DOCUMENTS

| | | |
|---|---|---|
| 3,332,327 A | 7/1967 | Heenan |
| 3,817,596 A | 6/1974 | Tanaka |
| 3,833,285 A | 9/1974 | Heenan |
| 3,923,378 A | 12/1975 | Heenan |
| 4,349,598 A | 9/1982 | White |
| 4,498,733 A | 2/1985 | Flanagan |
| 4,775,219 A | 10/1988 | Appeldorn et al. |
| 4,875,798 A | 10/1989 | May |
| 4,938,563 A | 7/1990 | Nelson et al. |
| 5,425,596 A | 6/1995 | Steere et al. |
| 5,854,709 A | 12/1998 | Couzin |
| 6,015,214 A | 1/2000 | Heenan et al. |
| 6,282,026 B1 | 8/2001 | Dreyer et al. |
| 6,365,262 B1 | 4/2002 | Hedblom et al. |
| 6,451,408 B1 | 9/2002 | Haunschild et al. |
| 7,261,424 B2 | 8/2007 | Smith |
| 2001/0048847 A1 | 12/2001 | Khieu et al. |
| 2002/0141060 A1 | 10/2002 | Lu et al. |
| 2003/0075815 A1 | 4/2003 | Couzin et al. |
| 2006/0007542 A1 | 1/2006 | Smith |

FOREIGN PATENT DOCUMENTS

WO    99/15920 A1    4/1999

OTHER PUBLICATIONS

International Search Report for PCT/US2004/043209 dated Apr. 21, 2005.
Yoder, Jr., P. R.; "Study of Light Deviation Errors in Triple Mirrors and Tetrahedral Prisms;" Journal of the Optical Society of America; Jul. 1958; pp. 496-499; vol. 48, No. 7; Fire Control Instrument Group, Frankford Arsenal, Philadelphia, PA.

(Continued)

*Primary Examiner* — Mathieu D. Vargot
(74) *Attorney, Agent, or Firm* — Roberts Mlotkowski Safran & Cole P.C.

(57) ABSTRACT

Retroreflective articles having cube corner elements are disclosed, with the dihedral angle errors of the cube corner elements selected to limit the visibility range of the retroreflective article. Also disclosed are methods for making the cube corner elements and the retroreflective articles.

6 Claims, 16 Drawing Sheets

OTHER PUBLICATIONS

"Introducing Lex-Efx LLedge Edgelit Panel;" Lighting News, A Publication of LexaLite International Corporation; Mar. 2002; LexaLite International Corp.; Charlevoix, Michigan.

Thomas, David A. and Wyant, J. C.; "Determination of the Dihedral Angle Errors of a Corner Cube From Its Twyman-Green Interferogram;" J. Opt. Soc. Am., Apr. 1977; vol. 67, No. 4; Optical Sciences Center, University of Arizona, Tucson, Arizona.

"Standard Specification for Plowable, Raised Retroreflective Pavement Markers;" Oct. 31, 2002; pp. 1-9; ASTM International, West Conshohocken, PA.

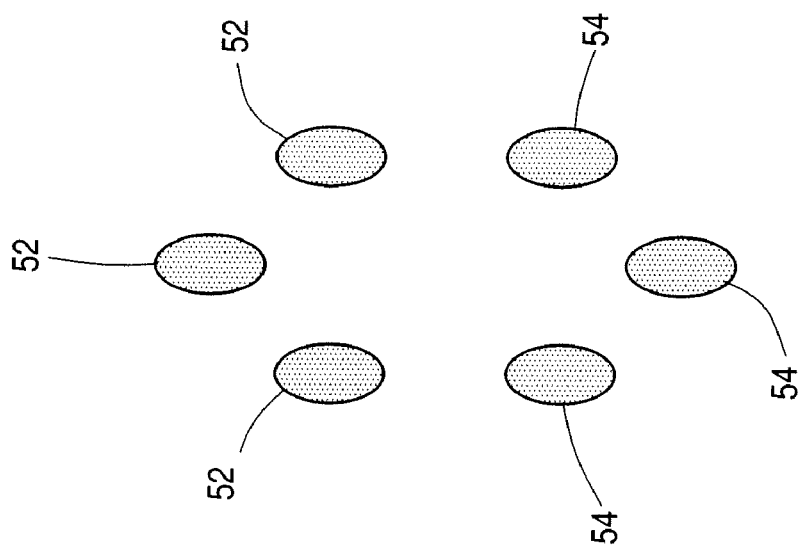
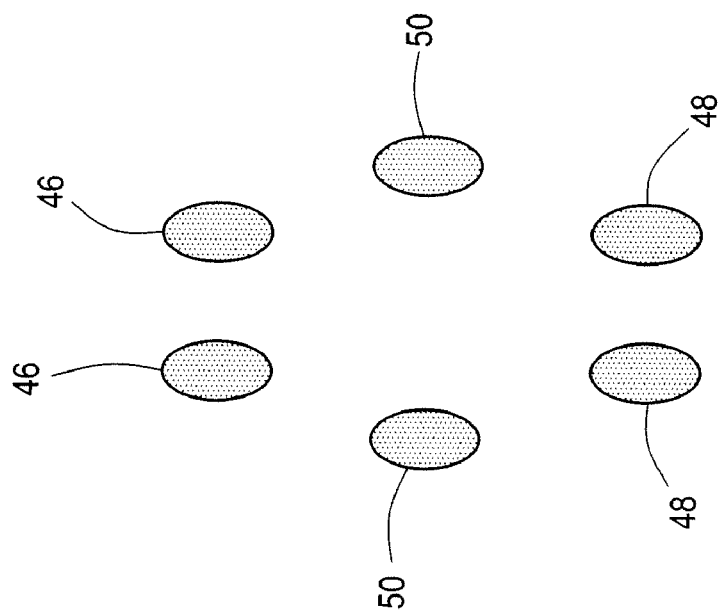

Spot patterns for example 1 at different horizontal entrance angles

TOOL FOR MAKING A CUBE CORNER RETROREFLECTOR WITH LIMITED RANGE

CROSS REFERENCE TO RELATED APPLICATIONS

This application is a divisional application claiming priority to U.S. application Ser. No. 11/018,828, filed Dec. 21, 2004, now U.S. Pat. No. 7,370,981, which in turned claimed the benefit under 35 U.S.C. §119(e) of U.S. Provisional Application 60/532,496 filed Dec. 24, 2003, both titled CUBE CORNER RETROREFLECTOR WITH LIMITED RANGE, which applications are hereby incorporated by reference in their entirety.

BACKGROUND

The present invention generally relates to retroreflective articles, and, more specifically, to cube corner retroreflectors having selectively reduced visibility range.

Retroreflective articles are well-known for applications such as highway signs, safety reflectors, and road markers. Generally, cube corner versions of these articles have a frontal lens of clear, colored or uncolored resin, such as methyl methacrylate, with a smooth front surface and a plurality of retroreflective cube corner elements on the rear surface. The cube corner elements each have three reflecting faces.

Light from a remote source passes through the smooth front surface, reflects off each of the three faces of a cube corner element, and passes again through the front surface. In a perfect retroreflector, this light is returned in a direction exactly opposite to the incoming direction of light. Primarily because of imperfections, either accidental or by design, the reflected light is not returned only in a direction exactly opposite to the incoming direction, but rather is returned typically into a spreading pattern, centered on the exact return direction. This imperfect return reflection is still termed "retroreflection". The spread retroreflected light enables the retroreflector to be visible from directions slightly away from the light source.

For example, if headlights from an automobile are the source of light, then the perfect retroreflective pavement marker would reflect light back only toward the headlights. It is desirable that the reflected light from a retroreflective pavement marker be seen by the driver of the automobile, whose eyes are generally higher than and somewhat left or right of the headlights.

Changes to the size or shape of the faces of the cube corner prism elements, or to the angles between the faces (dihedral angles), or to the flatness of the faces or the flatness of the front surface, can all change the pattern of retroreflection and thereby determine the regions around the light source in which the retroreflector visible. "Study of Light Deviation Errors in Triple Mirrors and Tetrahedral Prisms", J. Optical Soc. Amer., vol. 48, no. 7, pp. 496-499 (July 1958) by P. R. Yoder, Jr., describes spot patterns resulting from the angles between faces being not exactly right angles. U.S. Pat. No. 3,833,285, to Heenan, which is incorporated in its entirety herein by reference, teaches that having one dihedral angle of a macro-sized cube corner element greater than the other two results in extended observation angularity in macrocubes, and specifically that the retroreflected light diverges in an elongated pattern. This elongated pattern has a generally substantially vertical axis. U.S. Pat. No. 4,775,219, to Appeldorn et al., teaches redistribution of the reflected light so that more light is directed to the driver of approaching vehicles or extending the pattern of light by modifying the dihedral angles of micro-sized cube corners.

The angle formed between the source, the retroreflector, and the observer is called the observation angle. Conventional pavement markers and other retroreflective articles are generally designed to be highly visible at long distances, corresponding to small observation angles. Because of imperfections, generally accidental, in conventional retroreflective articles, they are also highly visible at middle and close distances, corresponding to medium and large observation angles. For each type of retroreflector in each application, the relative value of long, medium, and close visibility may differ. Some researchers have suggested that long distance visibility of pavement markers might not be useful, or even have negative value.

SUMMARY OF THE INVENTION

The present invention provides a retroreflective article having cube corner prism elements that are constructed to selectively limit the range at which the article is visible. The retroreflection of light from the article at small observation angles, for example 0.3 degrees and less, is selectively limited. While the article may still be visible at long distance, the intensity of the reflected light is limited. This has application, for example, in raised pavement markers, so that the marker is visible to a vehicle driver sufficiently in advance of the marker to enable the driver to react to the marker, but with limited visibility at larger distances from the marker to avoid excessive road preview and avoid distraction of the driver.

Retroreflective road markers made in accordance with the present invention will have limited visibility beyond a certain distance D, and high visibility at substantially closer distances. A consequence is that the retroreflectance of such articles is not a simply decreasing function of observation angle, as is the retroreflectance of conventional retroreflectors. The retroreflectance of an article made in accordance with the present invention generally has a peak value at a selected observation angle with decline at observation angles less than the selected observation angle to assure more rapid decrease of visibility beyond a selected distance than conventional retroreflectors exhibit.

The variation of retroreflectance with observation angle can be obtained by deviating the dihedral angles of the cube corner prism elements from the orthogonal to obtain cube corner dihedral angle errors. The intensities of retroreflected light at desired observation angles may be obtained by making the cube corners divergent or convergent sufficiently to direct the retroreflected light away from the undesired observation angles.

Articles made in accordance with the present invention will have patterns of retroreflection that are relatively weak in their centers, at the smallest observation angles corresponding to long distances, and stronger away from their centers at the middle observation angles, especially at the relevant Epsilon angles. Such light patterns correspond to the needs of drivers at moderate distances.

An example to bring about the desired functional coefficients of luminous intensity is to form the cube corners to produce an efficient light reflection pattern by molding acrylic resin, for example, to obtain cube corner elements having dihedral angle errors of about 0 degrees, −0.13 degrees, and 0 degrees. The third value refers to a dihedral edge in an approximately vertical left-right symmetry plane of the marker. This would result in an efficient light reflection pattern in a raised pavement marker having a 30 degree sloping front.

The cube corner element made from a cube corner tool has three dihedral angle errors corresponding to the three dihedral angle errors in the cube corner tool. The process, such as molding, for forming the cube corner elements from the cube corner tool generally will cause some shrinkage of the angles in the cube corner elements, which may not be equal for the three dihedral angles. There is a transformation of dihedral angles, wherein for each of the three dihedral angles the amount of change between the dihedral angle errors of the cube corner element in the tool and the dihedral angle errors of the cube corner element in the molded part is independent of the dihedral angle errors in the tool, and substantially constant for repeated applications of the forming process. A retroreflector generally has many cube corners, and, for discussion purposes, it is presumed that the same transformation applies to all the cube corners in the retroreflector, although this is not necessarily the case. Applied to the example of the previous paragraph, if the molding process transforms dihedral angle errors by about −0.04, about −0.04, and about −0.07 degrees, respectively, then the desired cube corner article having dihedral angle errors of about 0 degrees, −0.13 degrees, and 0 degrees would be made from a tool having dihedral angle errors of about +0.04 degrees, −0.09 degrees, and +0.07 degrees. For some forming processes the transformation amounts are positive, meaning dihedral angle swelling instead of shrinking, and there may also be processes where the amounts are zero. The manufacturer must know his process before making tools so that the final retroreflective part has the desired dihedral angles.

The present invention includes cube corner elements designed to produce a pattern of retroreflection to selectively limit the range of visibility, the tools to make such cube corner elements, and methods for making retroreflective articles having such cube corner elements.

BRIEF DESCRIPTION OF THE DRAWINGS

FIG. 5 is a representation of a spot pattern of reflected light from a typical prior art raised pavement marker;

FIG. 6 is a representation of a spot pattern of reflected light from a rotated cube corner of the prior art;

FIG. 7 is a representation of a spot pattern of reflected light from one embodiment of the present invention;

DETAILED DESCRIPTION OF THE INVENTION

Figure 1:
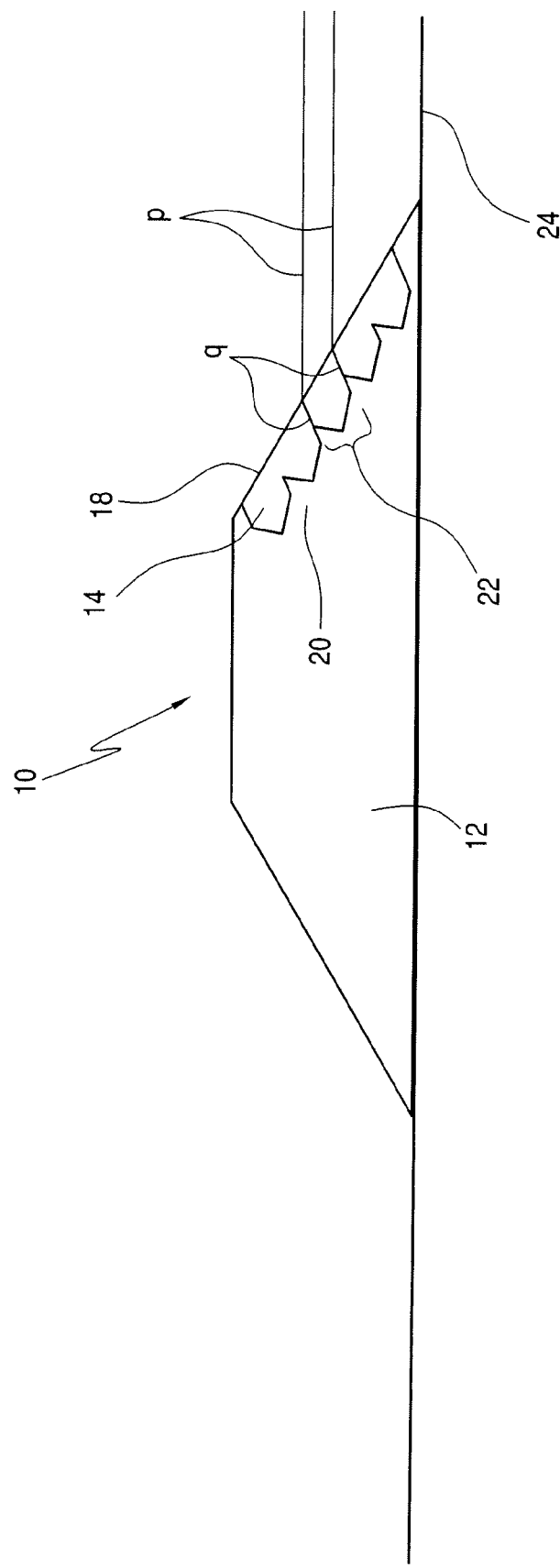
FIG. 1 is a sectional elevational schematic view of a raised pavement marker illustrating one embodiment of the present invention.

The present invention is directed to retroreflective cube corner elements providing selectively limited visibility range, retroreflective articles having such cube corner elements, and tools and methods of making such cube corner elements and retroreflective articles. The cube corner elements may be used in all retroreflective items, such as in sheeting for highway signs and reflective vests and in lenses for vehicle reflectors but are particularly well suited for use in raised pavement markers and other road delineators. The invention is described in relation to a raised pavement marker retroreflecting the light of the headlights of a car. Reflectors on vehicles, or other retroreflective items, such as signs, also may be limited in range in the manner described herein. Specific parameter values may be determined by those of ordinary skill in the art without undue experimentation. The particular embodiments described are illustrative only, and the invention is limited only by the claims.

Use of the terms "horizontal" and "vertical" herein in reference to raised pavement markers presumes the marker to be mounted on horizontal pavement. The term "road direction" used herein in reference to a raised pavement marker means the horizontal direction from which a vehicle extremely far away on a straight road would illuminate the marker properly mounted on the road. The term "horizontal entrance angle" used herein is defined as the angle between the direction of light incident on the pavement marker and the road direction, as projected into a horizontal plane. The term "observation angle" herein is defined as the angle between a viewer's line of sight to a retroreflector and a line from a light source to the retroreflector. This observation angle correlates to distance from the retroreflective article. Generally, the farther the viewer is from the retroreflective article, the smaller the observation angle will be. At each distance, there are two observation angles for the typical vehicle, corresponding to the two headlights. The term "Epsilon angle" used herein is defined as the angle between two lines in the plane passing through the marker lens center and normal to the road direction. One line is vertical. The other line is the intersection of this plane with the plane containing the observation angle. This Epsilon angle correlates with the driver's position within a vehicle. The driver's being slightly right of the vehicle's left headlight produces a small positive value for this Epsilon. The driver's being far to the left of the vehicle's right headlight produces a larger negative value for this Epsilon. There are two Epsilons for a typical vehicle corresponding to the two headlights which make two observation angle planes. The term "the standard marker" used herein refers to a marker having macro cube corner elements with no intentionally-induced dihedral angle errors. Its lens has a forward projected area of 10 cm². Its retroreflective performance is defined by several measures throughout this application.

It is conventional to describe the retroreflectance by a coefficient of luminous intensity, termed "$R_I$" in the International Commission on Illumination (CIE) publication "Retroreflection: Definition and Measurement" (CIE Pub. 54.2). The $R_I$ is the ratio of the luminous intensity leaving the retroreflector, in a certain direction, to the illuminance received at the marker, in a certain direction. Since this is a retroreflector, the $R_I$ is high when the output direction is opposite to the input direction, or nearly so. The relation of input direction to output direction may be described with the two angles Alpha and Epsilon as defined in CIE Pub. 54.2. Alpha is observation angle and Epsilon is the tilt of the observation angle. Observation angle measures the divergence between the output direction and the input direction. The input direction may be described with the two angles Beta and Omega as defined in CIE Pub. 54.2. The variation of $R_I$ with Alpha and Epsilon is called the "pattern of retroreflection." In order to assign a single retroreflectance value at a particular observation angle Alpha in this pattern, it is necessary to make some assumptions about the vehicle geometry. This will produce a "Functional Coefficient of Luminous Intensity at observation angle Alpha" as explained below.

Road markers are almost always used to delineate driving lanes. When a road marker is at a certain distance from a vehicle, the Alpha angles for the left and right headlights can be estimated from the geometry of the vehicle and the driving lane. The headlight illuminance received by the road marker at this distances can be estimated from published data on headlight beam patterns. Except at very close distances, the left and right headlights provide nearly equal illuminance to markers. Then for each distance, the luminous intensity of the road marker, in the direction of the driver, is the product of the functional coefficient of luminous intensity with the expected illuminance.

Road markers are generally installed in equal interval rows. The most relevant visibility is not that of the individual road markers but of the section of the row comprising a small number of markers. An estimate of this visibility is nevertheless the luminous intensity of the individual markers. The estimate will be defined as indices VI1 and VI2 as explained below.

Once the input direction and output direction are specified, the coefficient of luminous intensity $R_I$ of a retroreflective marker is a definite measurable quantity. The input direction is defined as the road direction. The output direction depends on the two angles Alpha and Epsilon. There is no simple "$R_I$ at Alpha" because of the need to specify Epsilon. To produce a functionally relevant value corresponding to "$R_I$ at Alpha", assumptions are made about the vehicle geometry. The "international" assumption assumes three Epsilons, −45°, 0°, +45°, all applicable to the given Alpha. The "asymmetrical" assumption assumes Epsilon for the vehicle's left headlight to be +20° and Epsilon for the vehicle's right headlight to be −50°, and also producing two Alpha values, one for each headlight, from the given Alpha. The corresponding two definitions FRO1 and FRO2 are given in Table 1. By making further assumptions about the vehicle geometry, functionally relevant values corresponding to "$R_I$ at Distance D" are given in the two definitions FRD1 and FRD2 in Table 1. The relation of distance to observation angle embodied in these two definitions implies a vehicle larger than an standard passenger car. The constant 50 in the definition of FRD1 and the constants 40 and 60 in the definition of FRD2 all have units (meter·degree). It should be emphasized that each functional retroreflectance value FRO1, FRO2, FRD1, and FRD2 is determined definitely from two or three $R_I$ measurements on a marker. No further data are required for the determinations.

The ultimate measure of a retroreflector's function is its visibility. For road markers this is appraised as the individual marker's contribution to the visibility of a row of like markers. Each retroreflecting marker produces a luminous intensity. The luminous intensity is obtained from the retroreflectance value FRD1 or FRD2 by multiplication with the headlight's illuminance. The headlight illuminance will be assumed to follow an inverse 2.5 power law for distance. This decrease with distance is somewhat faster than the inverse square law because with increasing distance not only does the illumination beam spread, but its aim takes it away from the marker. The faraway road marker appears nearly as a point, so the luminous intensity should next be divided by the square of the distance, yielding the illuminance at the eye. Finally, the visual angular separation between successive faraway road markers is inversely proportional to the square of the distance. The latter two factors cancel in the visibility appraisal, leaving just the luminous intensity of the single marker.

Measure VID1 corresponding to Functional Retroreflectance FRD1 and measure VID2 corresponding to Functional Retroreflectance FRD2 are defined in Table 1. The functional retroreflectance is provided in millicandelas per lux (mcd/lx) and the distance in meters for these definitions. The constant 1000 in the definition has units (meter$^{0.5}$·steradian), making VID1 and VID2 unitless. VID1 is determined definitely from three $R_I$ measurements on a marker, and VID2 is determined definitely from two. No further data are required for the determination of VID1 or VID2.

Table 1 includes measure VIO1 which is derived from measure VID1 by replacing the distance term D in the definition of VID1 with the quantity 50 divided by the observation angle. The constant 50 in the definition of VIO1 has units (meter·degree). Measure VIO2 is derived from measure VID2 in a corresponding manner.

When using the definitions in Table 1, coefficients of luminous intensity are to be measured in mcd/lx, angles are to be measured in degrees, and distances are to be measured in meters.

TABLE 1

Measures of Marker Performance

| | |
|---|---|
| FRO1 International Functional Coefficient of Luminous Intensity at Observation Angle α | Average of: $R_I$ at Observation Angle = α with Epsilon = −45° $R_I$ at Observation Angle = α with Epsilon = 0° $R_I$ at Observation Angle = α with Epsilon = +45° |
| FRO2 Asymmetrical Functional Coefficient of Luminous Intensity at Observation Angle α | Average of: $R_I$ at Observation Angle = 1.2α with Epsilon = −50° $R_I$ at Observation Angle = 0.8α with Epsilon = +20° |
| FRD1 International Functional | Average of: $R_I$ at Observation Angle = 50/D with Epsilon = −45° |

TABLE 1-continued

Measures of Marker Performance

| | |
|---|---|
| Coefficient of Luminous Intensity at Distance D | $R_I$ at Observation Angle = 50/D with Epsilon = 0° |
| | $R_I$ at Observation Angle = 50/D with Epsilon = +45° |
| FRD2 Asymmetrical Functional | Average of: $R_I$ at Observation Angle = 60/D with Epsilon = −50° |
| Coefficient of Luminous Intensity at Distance D | $R_I$ at Observation Angle = 40/D with Epsilon = +20° |
| VID1 International Visibility Index at Distance D | $1000 \times FRD1/D^{2.5}$ |
| VID2 Asymmetrical Visibility Index at Distance D | $1000 \times FRD2/D^{2.5}$ |
| VIO1 International Visibility Index at Observation Angle α | $1000 \times FRO1 \times (\alpha/50)^{2.5}$ |
| VIO2 Asymmetrical Visibility Index at Observation Angle α | $1000 \times FRO2 \times (\alpha/50)^{2.5}$ |

The pair of Table 1 definitions FRO1 and FRD1, imply a correspondence of observation angle 50/D with distance D. The pair of Table 1 definitions FRO2 and FRD2 imply a correspondence of two observation angles 40/D and 60/D with distance D. It is helpful to regard the average of these two observation angles as a single "vehicular observation angle". Also the single observation angle 50/D in the first pair may be regarded as a "vehicular observation angle". The correspondence of observation angles with distance will be understood as a correspondence of vehicular observation angles with distance in the following paragraphs.

Suppressed or limited long-distance visibility for a retroreflective article, such as a raised pavement marker, is obtained by retroreflective tuning. Three key distances in the road scenario are identified: "too far"; "far enough"; and "close enough". The article may be made so that its functional coefficient of luminous intensity is low for observation angles less than a first selected observation angle corresponding to "too far", yet high enough for adequate visibility at a second observation angle, corresponding to "far enough", and then continuing so it still has no less than a third value at a third selected observation angle, corresponding to "close enough", so that the marker is highly visible between the distances corresponding to the second and third observation angles. The first selected observation angle is that associated with a distance from the marker corresponding to that point beyond which a driver of a vehicle would have excessive road preview with potential distraction of the driver. For example, this observation angle may about 0.2 degrees, corresponding to about 250 meters road distance for a driver of an oversized passenger vehicle. The second selected observation angle may be about 0.4 degrees, corresponding to about 125 meters for a driver of an oversized passenger vehicle. The third selected observation angle corresponds to that distance near to the marker at which the marker ceases to need to be highly visible to the driver. This observation angle may be about 1.0 degrees, approximately corresponding to about 50 meters road distance for the driver of a oversize passenger vehicle. Any other observation angles may also be chosen for the first, second, or third observation angle.

Currently, ASTM D4280-04 (Standard Specification for Extended Life Type, Nonplowable, Raised Retroreflective Pavement Markers) provides that white raised retroreflective pavement markers shall have an $R_I$ of at least 279 millicandelas per lux at an observation angle of 0.2 degrees, Epsilon angle of 0 degrees, and a horizontal entrance angle of 0 degrees. Most standard markers manufactured to this specification have much higher $R_I$ than this at these angles, because road markers must be made with allowance for wear. These standard markers have high visibility at long distance until they are well worn.

Excessive road preview is a function of the intensity of the light reaching the driver from very far away markers. When the VID1 or the VID2 of the marker is less than a first value, the visibility to the vehicle driver is reduced such that the driver does not have excessive road preview, thereby avoiding distraction of the driver.

The maximum VID1 and VID2 values established for excessive road preview and driver distraction may have different values depending on the specific circumstances of the road, traffic, climate, etc. Correspondingly, the values for the functional coefficient of luminous intensity and the first, second, and third observation angles will vary depending upon the specific application. These values may also be slightly different for white, yellow, or other colored markers.

While the embodiment described herein relates to the use of a white raised pavement marker, the invention includes raised pavement markers of any color, and includes cube corner elements of any color. This includes white, yellow, red, green, and blue, as set forth in ASTM D4280-04, as well as any other color. Color may be selected without departing from the spirit and scope of the invention.

The $R_I$ values discussed herein apply to standard sized road markers having approximately 10 cm² of lens area, measured projected in the forward direction. Retroreflectance scales with lens area, so if a certain $R_I$ value is achieved by markers discussed herein, markers having lens area X, in square centimeters, measured projected in the forward direction, would have X/10 times the mentioned $R_I$ value. Similarly, the values of the functional coefficients of retroreflection and the values the visibility indices scale with area.

For some markers of the present invention, the value of the functional coefficient of luminous intensity follows a curve having a single peak near the "far enough" observation angle. The functional coefficient of luminous intensity for a marker made in accordance with the present invention in FIGS. 14A and 14C exemplifies this characteristic.

In one embodiment, the maximum value of the functional coefficient of luminous intensity FRO1 occurs between observation angles of about 0.3 degrees and about 0.4 degrees. The functional coefficient of luminous intensity is less than the maximum value at observation angles less than about 0.3 degrees and greater than about 0.4 degrees. In one embodiment, the functional coefficient of luminous intensity at an observation angle of about 0.4 degrees is greater than the functional coefficient of luminous intensity at observation angles of about 0.2 degrees or less. See FIG. 14A.

In one embodiment, the maximum value of the functional coefficient of luminous intensity FRO2 occurs between observation angles of about 0.4 degrees and about 0.5 degrees. The functional coefficient of luminous intensity is less than the maximum value at observation angles less than about 0.4 degrees and greater than about 0.5 degrees. In a preferred embodiment, the functional coefficient of luminous intensity at an observation angle of about 0.5 degrees is greater than the functional coefficient of luminous intensity at observation angles of about 0.2 degrees or less. See FIG. 14C.

In contrast, prior art pavement markers are designed to maximize the functional coefficient of luminous intensity at small observation angles so as to increase the visibility of the marker at long distances. See, e.g., the functional coefficient of luminous intensity for the standard marker in FIGS. 14A and 14C. The intensity generally is a rapidly declining function of the observation angle—the intensity is greatest at the smallest observation angles and decreases rapidly as the observation angle increases. For example, the functional coefficient of luminous intensity for the standard marker at an observation angle of about 0.4 degrees is less than one-third the functional coefficient of luminous intensity at an observation angle of about 0.2 degrees. See Tables 3 and 4, below.

The Visibility Index of a retroreflector in accordance with the present invention is less than 0.5 at observation angles of about 0.2 degrees and less, corresponding to a distance of about 250 meters and more, as shown in Tables 5 and 6, below. The Visibility Index of a retroreflector in accordance with the present invention is also less than that of the standard marker for observation angles of about 0.3 degrees and less, corresponding to a distance of about 167 meters, and greater than that of the standard marker for observation angles of between about 0.4 and about 1.0 degrees, corresponding to a distance of between about 125 meters and about 50 meters, as shown in Tables 5 and 6, below.

The retroreflective article of the present invention preferably includes a layer of optically clear material having a smooth front surface and a plurality of retroreflective cube corner elements on the reverse surface. The cube corner elements are preferably macro cube corner prisms with diameters between about 1 mm and about 3 mm. The material may be any conventional plastic used for retroreflective items, including polycarbonate, vinyl, nylon, methyl methacrylate, and optical grade acrylonitrile butadiene styrene. The material is preferably a thermoplastic resin, for example, polycarbonate. Other optical materials, such as glass, may also be used. Material considerations include parameters other than optical qualities, such as hardiness or durability in the specific application, that will influence the choice of materials.

FIG. 1 illustrates a retroreflective article in accordance with the present invention, in which a raised pavement marker 10 has a housing 12 and a retroreflective lens 14. The housing 12 may be of any conventional material suitable for use as a housing, such as acrylic-styrene-acrylonitrile, and is preferably a thermoplastic material. The lens 14 may be of any transparent optical material such as acrylic, polycarbonate, or nylon and has a substantially smooth front face 18 for receiving light and a rear face 20 having a plurality of retroreflective cube corner elements 22 thereon. The angle of the lens assembly 14 with respect to the horizontal is preferably about 35 degrees, but may be any angle. Light rays, such as p, substantially parallel to the pavement surface 24, are refracted at the lens front face 18 to enter the cube corners 22 as light rays q.

Figure 2:
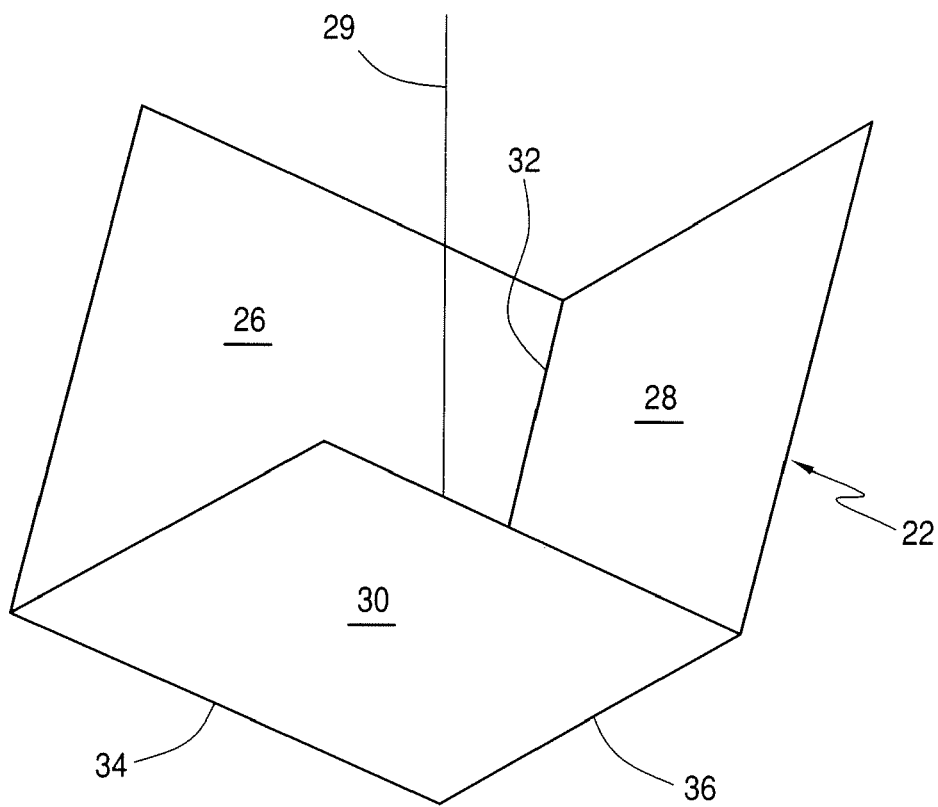
FIG. 2 is a geometrical representation of a retroreflective cube corner element of the present invention.

FIG. 2 is a geometrical representation of a cube corner element 22, with three mutually perpendicular faces 26, 28, and 30. The square shapes of the illustrated faces 26, 28, and 30 are not necessary for a cube corner. An incident light ray meets and is refracted by the front surface 18, illustrated in FIG. 1. For retroreflection, the refracted ray meets any face of the cube corner element 22, is reflected, meets a second face, is reflected, meets the third face, and is reflected to again meet the front surface 18 where it is again refracted. FIG. 2 shows the cube axis 29 having a direction that makes equal angles to the three faces 26, 28, and 30. It is common for cube corner elements to be configured within a tilted road marker lens in such manner that the direction q is parallel to the axis of the cube corner. Cube corners so configured in a lens are called "axial".

Figure 3:
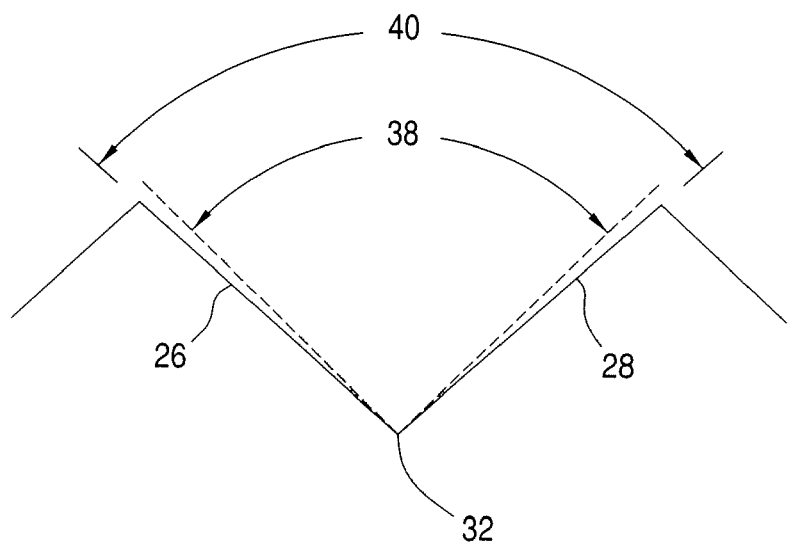
FIG. 3 is a geometrical representation of one of the dihedral angles of a retroreflective cube corner element of the present invention.

FIG. 2 illustrates that each cube corner element 22 has three dihedral edges 32, 34, 36. FIGS. 4A-D are drawn in the view in the refracted direction q from FIG. 1. One dihedral edge may be located so as to appear vertical in FIGS. 4A and 4B, or horizontal as in FIGS. 4C and 4D. In each case, the identified dihedral edge corresponds with dihedral error $e_3$. FIG. 3 illustrates the dihedral angle 40 between faces 26 and 28 viewed in the direction of dihedral edge 32. In a perfect cube corner element 22, the angle between each pair of faces 26, 28, and 30 at each of the dihedral edges 32, 34, and 36 is a 90 degree angle, as indicated by right angle 38 in FIG. 3. The actual angle 40 illustrated in FIG. 3 is larger than the right angle 38. The actual angle 40 may also be equal to or smaller than the right angle 38. The numerical difference between the actual angle 40 and a right angle 38 at dihedral edge 32 is the dihedral angle error for edge 32. The dihedral angle error for edge 32 is positive when angle 40 measures greater than 90 degrees and is negative when angle 40 measures less than 90 degrees. In making a cube corner tool it is possible to modify dihedral angle 40 to have any desired error. Independently, the angle at each of the other dihedral edges 34 and 36 may be modified from a right angle to any larger or smaller angle. The three dihedral angle errors characterizing a cube corner determine the directions of reflected light relative to the direction of incident light, for each of the six scenarios based on the order of the faces encountered, as explained in Yoder's cited paper.

The retroreflectance of such cube corner elements 22 placed into, for example, a raised pavement marker is affected by the angle of the lens assembly 14 with respect to the horizontal. In a preferred embodiment, the angle of the lens assembly 14 with respect to the horizontal is about 35 degrees, but any practical angle may be used, such as 30 degrees, 45 degrees, or any other angle greater than zero degrees and typically less than 90 degrees. The pattern of retroreflection will be influenced by this angle, because there is refraction at the front face 18.

Figure 4A:
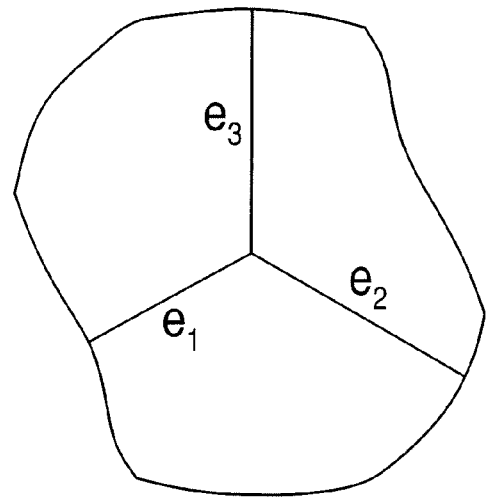
FIGS. 4A-D illustrate the dihedral naming convention for four kinds of cube corner elements.
Figure 4B:
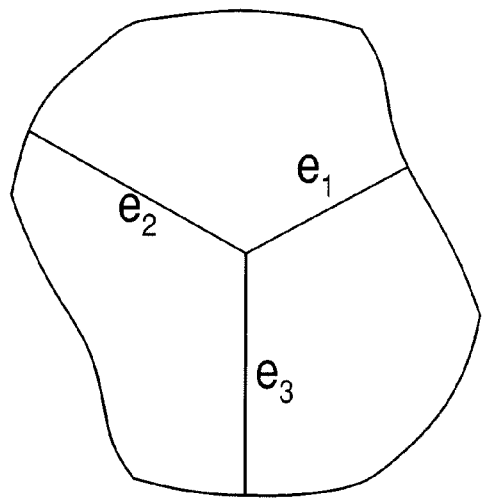

FIG. 5 illustrates an idealized reflection spot pattern of a typical cube corner element of the kinds illustrated in FIGS. 4A and 4B and having three equal dihedral angle errors in a tilted marker lens. Two spots 46, two spots 48, and two spots 50 represent the pattern of retroreflection. With respect to a raised pavement marker, upper spots 46 represent the light that is reflected for visibility at observation angles greater than a predetermined observation angle, such as for visibility by a vehicle driver, lower spots 48 represent light that is reflected toward the pavement, and middle spots 50 represent light reflected that also does not reach a vehicle driver to contribute to visibility. Note that only ⅔ of the light, that represented by spots 46, is reflected for visibility.

Figure 4C:
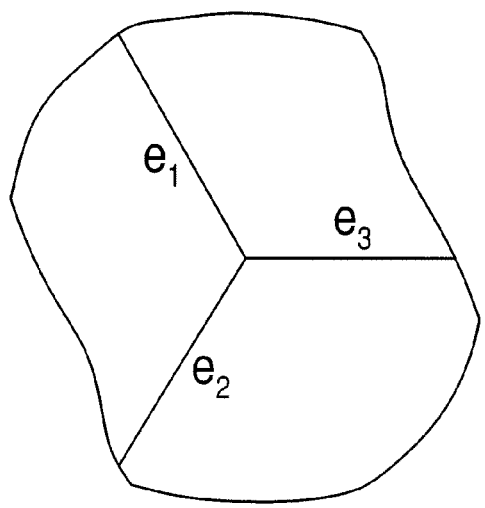
Figure 4D:
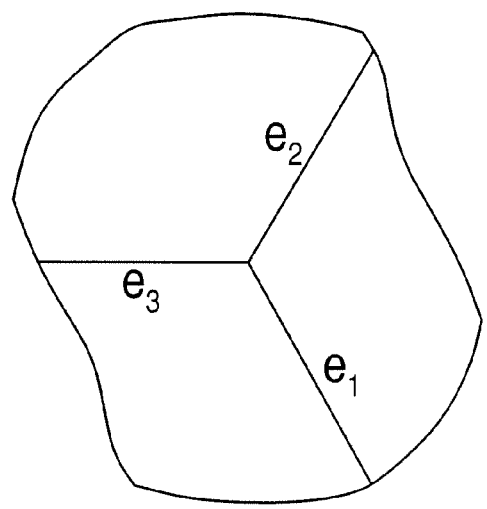

FIG. 6 illustrates an idealized reflection spot pattern of a cube corner element with three equal dihedral angle errors in which the element is rotated 90 degrees around its axis in a tilted marker lens. Such elements are illustrated in FIGS. 4C and 4D. The reflected light represented by three top spots 52 is reflected for visibility by a vehicle driver at observation angles greater than a predetermined observation angle and three bottom spots 54 represent light reflected toward the pavement. FIG. 7 illustrates a similar reflection spot pattern in which three top spots 52 are adjusted to provide a more concentrated reflection pattern by selection of dihedral angle errors. FIGS. 6 and 7 illustrate that ⅗ of the light is usefully reflected, instead of ⅔ of the light, as shown in FIG. 5.

Figure 8:
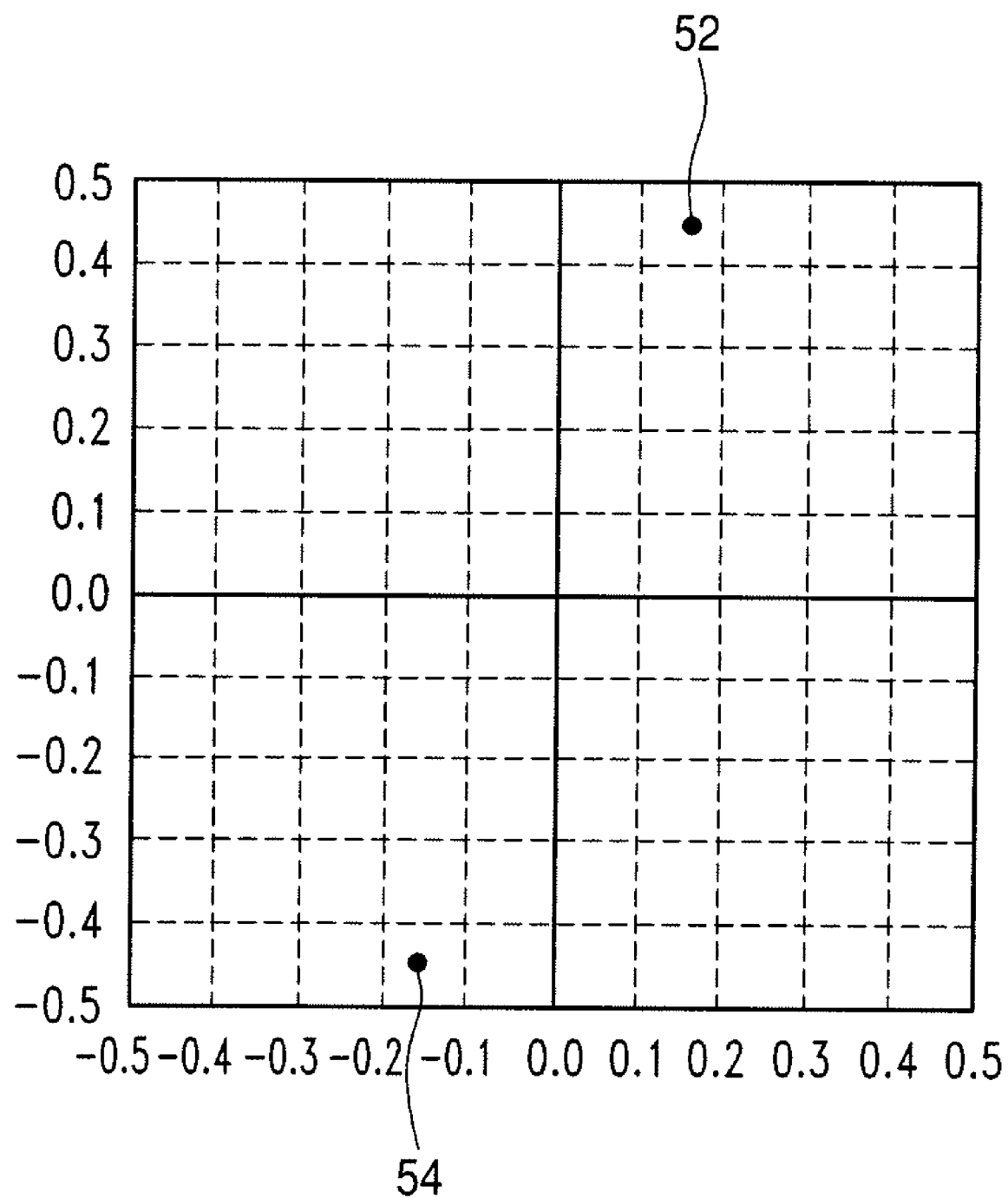
FIG. 8 is representation of a spot pattern of reflected light from another embodiment of the present invention.

FIG. 8 illustrates a spot pattern achieved using cube corners of the kinds illustrated in FIGS. 4A and 4B and in which three top spots 52 are coincident. The spot patterns of FIGS. 7 and 8 are achieved by manipulating the dihedral angle errors of the cube corner elements in accordance with the present invention. All spot patterns from plastic retroreflectors must be understood as idealized spot patterns. The actual spot patterns are not so clear as illustrated. The idealized patterns are the underlying patterns which randomization and distortions may obscure.

A cube corner element of the kind illustrated in FIGS. 4A and 4B having dihedral angle errors $e_1$, $e_2$, and $e_3$ of about 0 degrees, −0.13 degrees, and 0 degrees, respectively, will exhibit an idealized pattern of spots illustrated in FIG. 8 with a front face 18 at a 30 degree angle with respect to the horizontal. Raised pavement markers having about half of the cube corner elements with the −0.13 degree dihedral angle error on $e_2$ and half having the −0.13 degree dihedral angle error on $e_3$ will exhibit an idealized spot pattern combining FIG. 8 and the mirror image of FIG. 8 around a vertical axis to achieve the spot pattern shown in FIG. 9D that limits the range of the retroreflector.

The present invention results in a reflected idealized spot pattern in which the spots are directed mostly to the top of the reflection pattern, as illustrated in FIGS. 7 and 8. This selectively limits the range of visibility of the retroreflector.

The dihedral angle errors in the cube corners of a cube corner tool determine a pattern of spots. The cube corner tool is described in more detail below. If a cube corner of the tool is aligned as in FIG. 4A or 4B, and if it has the three dihedral angle errors $\{e_1, e_2, e_3\}$, Yoder's cited paper explains how the six spots then have locations in rectangular coordinates given by the algebraic expressions in Table 2. The dimensions of the coordinates, e.g., degrees, is the same as the dimensions of the dihedral angle errors. The algebraic expressions give very good approximations to the exact trigonometric expressions provided the incident light reaches the cube corners axially, as is the case with typical road marker lenses when the horizontal entrance angle is zero degrees. The spots are assumed to be viewed from the direction of the light entering the cube corner.

TABLE 2

Spot Coordinates

| | x | y |
|---|---|---|
| Spot 1 | $\sqrt{2/3}\,(e_1 - e_2 - 2e_3)$ | $\sqrt{2}\,(-e_1 - e_2)$ |
| Spot 2 | $\sqrt{2/3}\,(e_1 + e_2 + 2e_3)$ | $\sqrt{2}\,(-e_1 + e_2)$ |
| Spot 3 | $\sqrt{2/3}\,(-e_1 + e_2 - 2e_3)$ | $\sqrt{2}\,(e_1 + e_2)$ |
| Spot 1' | $\sqrt{2/3}\,(-e_1 + e_2 + 2e_3)$ | $\sqrt{2}\,(e_1 + e_2)$ |
| Spot 2' | $\sqrt{2/3}\,(-e_1 - e_2 - 2e_3)$ | $\sqrt{2}\,(e_1 - e_2)$ |
| Spot 3' | $\sqrt{2/3}\,(e_1 - e_2 + 2e_3)$ | $\sqrt{2}\,(-e_1 - e_2)$ |

For cube corners that are aligned as in FIG. 4C or 4D, the x and y dimensions in Table 2 are interchanged.

Table 2 may be used to determine the spot patterns from tools. In order to use Table 2 to determine the idealized spot pattern from plastic road marker lenses formed from the tools, first the values $e_1$, $e_2$, and $e_3$ need to be altered according to the transformation of the manufacturing process, discussed in greater detail below. Second, the formulas are applied. Third, the resulting values of x and y are multiplied by factors which depend on the refractive index of the plastic and the slope of the marker lens face. Refraction at the sloping lens front surface stretches or elongates, more vertically than horizontally, the spot pattern. The x values from Table 2 must be multiplied by n, the refractive index of the plastic, and the y values from Table 2 must be multiplied by $$\frac{\sqrt{n^2 - \cos^2\theta}}{\sin\theta}$$

where $\theta$ is the angle between the marker face 18 and the ground 24.

Dihedrally aberrated cube corners are specified by three parameters, $e_1$, $e_2$, and $e_3$. The variety of spot patterns must therefore be a three parameter family, or a small number of three parameter families. Most patterns are not achievable by reflection from dihedrally aberrated cube corners. Table 2 shows how the patterns of reflected spots are constrained. Spots 1', 2', 3' are just the antipodes of spots 1, 2, 3 respectively, implying that all achievable patterns have central symmetry. The triplet of spots 1, 2, 3 is further constrained by the algebraic relations in Table 2.

In particular, it can be shown from Table 2 that if any pattern of six spots is achievable by reflection from dihedrally aberrated cube corners then that pattern is achievable in only two ways, namely by some particular $\{e_1, e_2, e_3\}$, and by the negative aberration, $\{-e_1, -e_2, -e_3\}$. This invention realizes useful spot patterns achieved by dihedrally aberrated cube corners.

For the present invention, for cubes oriented as in FIG. 4A or 4B, a spot pattern is desired where y coordinates are all far from zero. Examining the y expressions in Table 2, this requires that the absolute values of $e_1$ and $e_2$ must be very different. It is also desired that no spot have x coordinate far from zero. Examining the x expressions in Table 2, the first two terms in parentheses include all the parenthesized parts of the y expressions. Since these, when multiplied by $\sqrt{2}$, are already far from zero, and since there will be $2e_3$ both added to and subtracted from some of them in the x expressions, the only way to not have large x coordinates is to make the absolute value of $e_3$ small. A simple solution will have the absolute values of $e_3$ and one of $e_1$ or $e_2$ small, such as less than about 0.03°, while the absolute value of the other of $e_1$ or $e_2$ is large, such as greater than about 0.10°. Thus an aberration like $\{0°, 0.13°, 0°\}$ is suggested by the desired pattern and the expressions of Table 2.

Cube types that have been used or proposed for road marker lenses fall into two kinds: a first kind with a dihedral edge in a left-right symmetry plane, and those rotated 90° from the first kind. For cube corners of the second kind, the x and y dimensions in Table 2 are interchanged. Inspection of Table 2 shows that no spot patterns achievable by dihedral errors of cubes of the first kind are also achievable by dihedral errors of cubes of the second kind, and vice versa.

FIGS. 4A and 4B illustrate schematically the kind of cube corner that has a left-right symmetry plane. One dihedral edge must be in the left-right symmetry plane. The view is in direction q shown in FIG. 1. FIGS. 4C and 4D illustrate schematically a second kind of cube corner which would be of the first kind except for a rotation of 90° about the direction q and viewed in the direction q. There is a dihedral edge appearing horizontal in each of FIGS. 4C and D, but this edge is not necessarily horizontal in the lens. The cube shapes in FIGS. 4A-D are anonymous, and not pertinent to the distinction into two kinds. Thus, the cube shapes may be triangular, rectangular, hexagonal, or any other suitable shape without departing from the spirit or scope of the invention. FIGS. 4A-D also indicate the convention for denoting the dihedral angles according to the error terms $e_1$, $e_2$, and $e_3$.

In this application, the road marker examples have their lens assembly 14 at 30 degrees with respect to the horizontal and made of substantially acrylic plastic having a refractive index of 1.49. The methods of achieving limited range are equally applicable to other lens slopes and other refractive indices. The two stretch factors, n and $$\frac{\sqrt{n^2 - \cos^2\theta}}{\sin\theta},$$

adjust the results of Table 2 to various slopes and indices. For use with non-axial cube corners it is suggested that the axial case be calculated as first approximations and final verification be done by ray tracing. For designing light patterns at large horizontal entrance angles, ray tracing is necessary. Metallization does not directly change the effects of the dihedral angle errors for macro sized cube corners, but it does for micro sized cube corners, by its effect on diffraction. For both, the reduced overall retroreflectance of the metallized marker may necessitate modification of the dihedral angle errors to effect the desired spot pattern and visibility characteristics.

Figure 18:
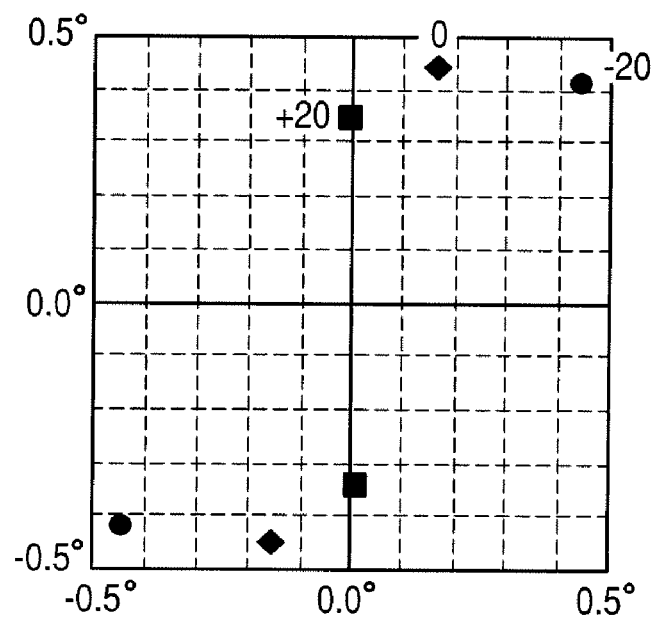
FIG. 18 illustrates the spot patterns from the same molded part as illustrated in FIGS. 8 and 9C, but with the horizontal entrance angle at a non-zero degree value.
Figure 19:
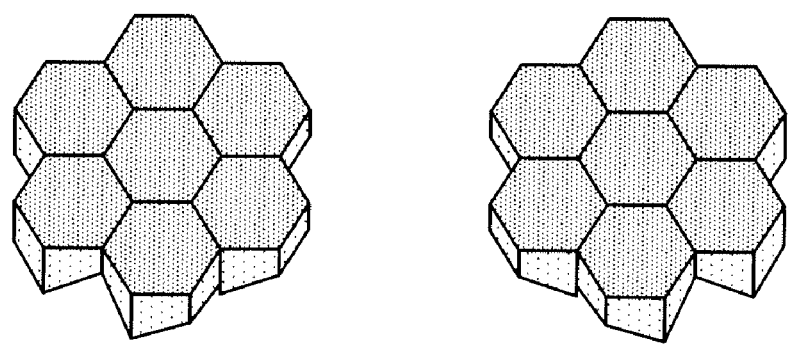
FIG. 19 illustrates how hexagonal cube corners can be assembled in a tightly packed array for the marker lens of Example 3.

FIG. 18 illustrates how a spot pattern may change for horizontal entrance angles very different from zero degrees. The cube corners for the illustration are acrylic of the kind in FIG. 4A with dihedral errors {0°, −0.13°, 0°} configured axially in a road marker having its lens face tilted 30° with respect to the road surface. The spot pattern continues to consist of two spots but the pattern changes size and rotates with change of horizontal entrance angle. The spot denoted "0" and its antipode in FIG. 18 correspond to zero degree horizontal entrance angle, and are the same as in FIGS. 8 and 9C. The spot denoted "+20" and its antipode correspond to +20° horizontal entrance angle and the spot denoted "−20" and its antipode correspond to −20° horizontal entrance angle. Positive horizontal entrance angle pertains to markers on roads curving to the left; negative horizontal entrance angle pertains to markers on roads curving to the right. Twenty degrees is the greatest horizontal entrance angles generally required from road markers. The pattern distortion illustrated in FIG. 18 is of similar kind and degree to that of other spot patterns at the these entrance angles. An idealized spot pattern that is highly efficient at zero degree entrance angle will generally be acceptably efficient at the larger entrance angles. Nevertheless raytrace analysis or experimental confirmation is recommended.

If a color other than white is selected for the cube corner elements, or for the raised pavement marker, then the dihedral angle errors may be different to achieve the desired limited long-distance visibility. Generally, use of a color other than white will result in a reduced functional coefficient of luminous intensity achieved by the marker. Choice of color may not directly change the effects of the dihedral angle errors, but the choice of color may require changing the dihedral angle errors to increase the functional coefficient of luminous intensity achieved by the marker. Or the target functional coefficients of luminous intensity to be achieved by the marker may be different for a colored marker than for a white marker. These specific dihedral angle errors may be determined without undue experimentation in the event that a color other than white is selected.

The cube corner elements are manufactured, for example, by conventional precision injection molding. One way in which to manufacture such cube corner elements 22 is generally to make a master plate by clustering metal pins having male cube corners ground and polished onto their tips or otherwise creating a pattern of male cube corners on a planar surface of a master plate. The master plate is then used to create one or more tools, comprising female cube corners, such as by electroforming. Further generations of male, female, etc. may be created, such as by electroforming. The final working tool is a mold comprising female cube corners into which the transparent lens material is placed. The lens material is allowed to take a shape corresponding to the cube corners of the mold. The lens material is allowed to harden and is removed from the mold. The lens material may be further cured either while in the mold or after removal from the mold to achieve the desired degree of hardness and other properties.

The manufacture of such tool is known in the art and, except as discussed herein, any conventional manner of making such a tool may be utilized without departing from the spirit and scope of the present invention. The mold may be of any conventional material suitable for use as a mold, preferably electroform nickel.

While the faces of the tool's cube corners may be extremely flat, the faces of molded cube corners are generally much less flat. Dihedral angles could properly be assigned to the intersections of the three planes that best fit the cube faces. The most convenient way to measure the dihedral angles of a flat faced female cube corner is with an interference microscope. The interference microscope measures the slopes of six portions of the wavefront leaving the cube corner. When the cube corner's faces have curvature, the six portions of the wavefront have curvature. The curvatures of the individual faces cannot be unambiguously determined from the curvatures of the wavefront. Fitting six best fitting planes to the six portions of the wavefront is therefore not equivalent to fitting three planes to the three cube faces. The dihedral angles of the molded macrocube corners must be understood as unmeasured idealizations, just as the spot patterns from molded macrocube corners are idealizations. The magnitude of the dihedral angle errors in the cube corner element 22 may be estimated.

The difference between the working tool dihedral angle errors and the resulting cube corner element 22 dihedral angle errors may be used to predict the resulting cube corner element 22 dihedral angle errors based on the tool dihedral angle errors, adjusted for the estimated error shrinkage or growth by the particular lens forming process used. This allows for determination of the proper tool dihedral angle errors to achieve the desired cube corner element 22 dihedral angle errors. For example, if the particular process used shrinks all dihedral angle errors by 0.05 degrees, and if the desired lens cube corner element 22 dihedral angle errors are 0 degrees, −0.13 degrees, and 0 degrees, then the tool dihedral angle errors are made to be +0.05 degrees, −0.08 degrees, and +0.05 degrees. Use of such a tool with this process resulting in the known dihedral angle error shrinkage then yields the desired cube corner element 22 dihedral angle errors.

The male cube corner prisms illustrated as elements 22 in FIG. 1 are molded or otherwise formed from generally nickel metal having corresponding hollow female cube corners. The tools are generally evolved from machined masters by nickel electroforming. The machined masters themselves may be of many materials, even plastic materials provided their surface can be made conductive for the electroforming. The evolution from master to final tool may involve several electroforming steps, and these may modify the dihedral angles of the cube corners. The stress of the deposited nickel playing upon the geometry of the arrayed cube corners can produce unequal deviations in $e_1$, $e_2$, and $e_3$ during the evolution of the tool. However, the fact that rather unusual values of $e_1$, $e_2$, and $e_3$ may be required for execution of this invention introduces no additional complication. Whatever angle additions or subtractions are found to occur to $e_1$, or to $e_2$, or to $e_3$ during the evolution of a prior art tool having the same form of array of cube corners will occur also with the respective $e_1$, $e_2$, and $e_3$ of the present invention.

The rather unusual values of $e_1$, $e_2$, and $e_3$ in tools which may be required for the present invention will generally require rather unusual values of $e_1$, $e_2$, and $e_3$ in the machined masters from which the tools evolve. To make pins with general dihedral angles $e_1$, $e_2$, and $e_3$ requires setting three different tilts for the grinding and polishing of the three different faces. In the case of micro cubes, the cited U.S. Pat. No. 4,775,219 describes ruling methods for producing some desired dihedral angles with the complication that these methods also produce some undesired dihedral angles. The methods given in U.S. Pat. No. 6,015,214 to Heenan, et al., avoid this problem.

A cube corner element made from a cube corner tool has dihedral angle errors corresponding to the dihedral angle errors in the cube corner tool. The process of molding the cube corner elements from the cube corner tool transforms the angles in the cube corner elements in a simple additive way. These addends are denoted $T_1$, $T_2$, and $T_3$, corresponding to the errors $e_1$, $e_2$, and $e_3$, respectively. Injection molding typically results in shrinkage of the cube corner which causes subtractions from the dihedral angles. In a flat retroreflector comprising many hexagonal cube corners there is perfect 120° rotational symmetry, and the dihedral angles generally all transform alike. However, in the tilted retroreflective lens for a road marker where there is pronounced asymmetry, the three dihedral angles generally transform by unlike amounts. The amounts depend not only on the cube geometry but on the plastic material and the conditions of molding.

The process of molding transforms the dihedral angles $\{e_1, e_2, e_3\}$ of the tool into new dihedral angles $\{e_1+T_1, e_2+T_2, e_3+T_3\}$ in the plastic lens. The values of the transformation addends depend on the corner cube shape and size and configuration, the thickness of the reflex lens, its material, and its forming process. These values may be determined for each specific application without undue experimentation. For a common marker lens designed for 30° slope with hexagonal cube corners having diagonals 2.76 mm and oriented as in FIG. 4A, the total lens thickness being about 3.43 mm, the plastic being an acrylic and the forming process injection molding, under the particular molding conditions of the trial the $\{T_1, T_2, T_3\}$ was found to be approximately $\{-0.04°, -0.04°, -0.07°\}$.

Figure 9A:
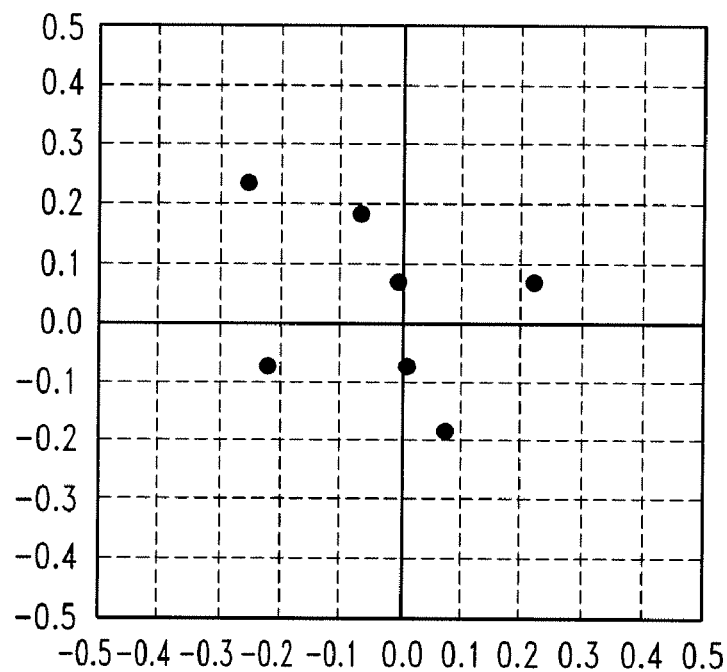
FIGS. 9A-D illustrate, respectively, the spot pattern from a cube of a tool from Example 1, the spot pattern from a cube from a corresponding molded part but as-if in a tool, the spot pattern from a cube from the corresponding molded part in its sloping plastic lens, and the spot pattern from a pairing of mirror image cubes in the molded part.
Figure 9B:
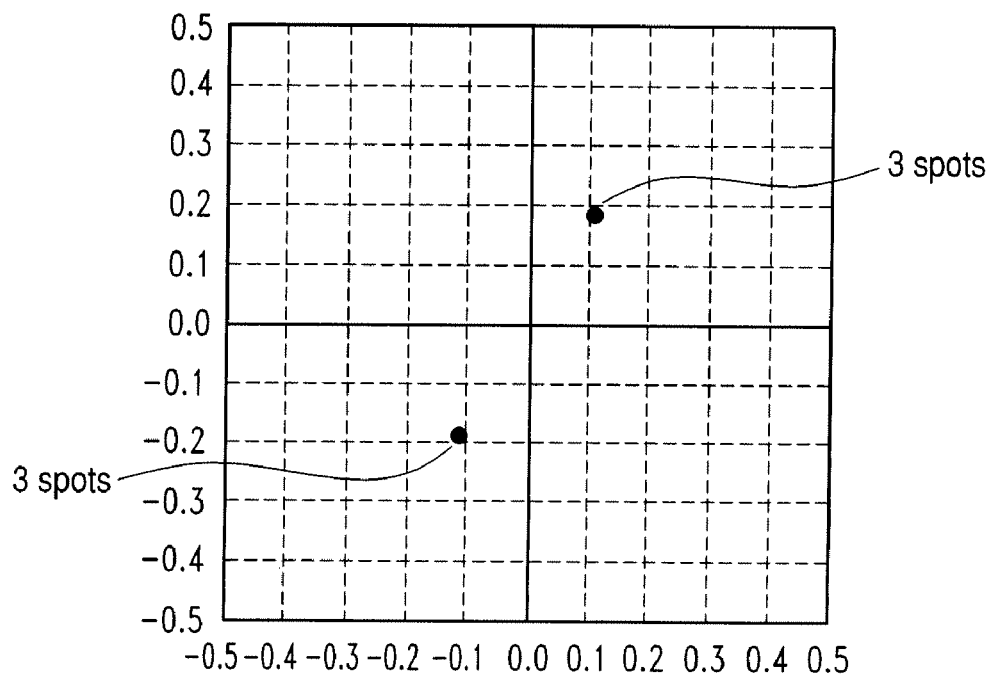
Figure 9C:
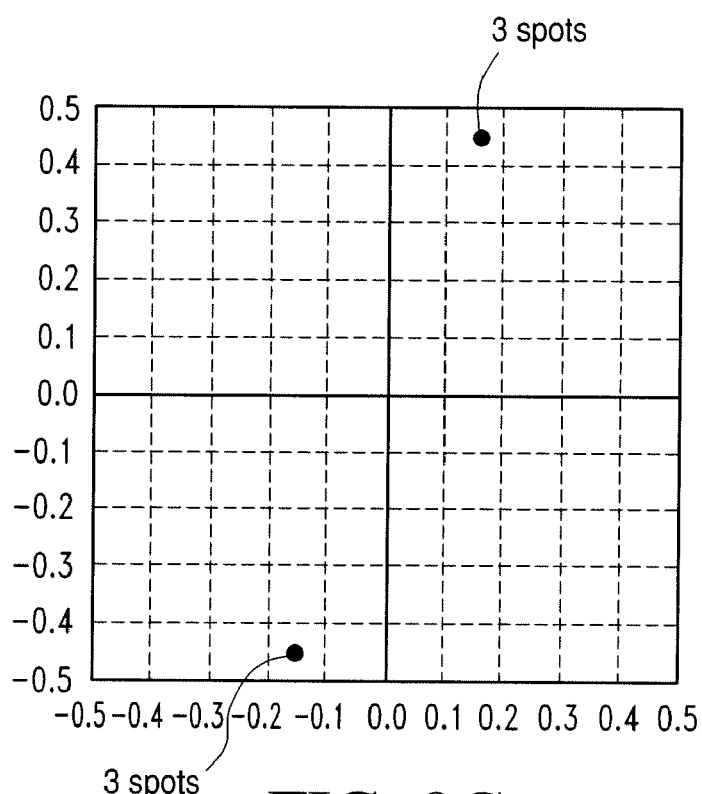
Figure 9D:
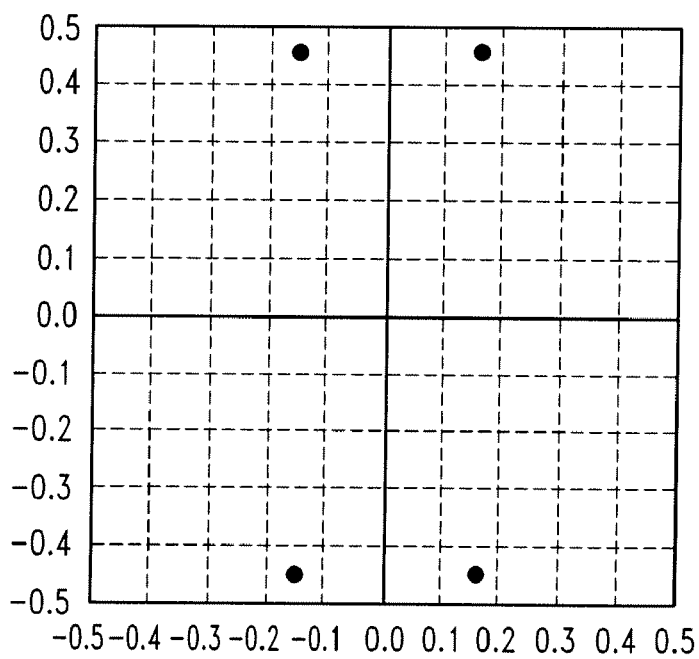

FIGS. 9A-C illustrate how the reflection pattern from the molded part is determined by the reflection pattern from the tool. FIG. 9A shows the pattern from a cube of the tool. According to Table 2, this pattern could only be produced by cubes having dihedral errors $\{e_1,e_2,e_3\}$ equal to $\{+0.04°, -0.09°, +0.07°\}$ or equal to the negatives $\{-0.04°, +0.09°, -0.07°\}$. Suppose that the tool's cubes satisfy the first solution, $\{+0.04°, -0.09°, +0.07°\}$. Molding imposes an additive transformation $\{-0.04°, -0.04°, -0.07°\}$ on the cube tool's dihedral angles, producing the new dihedral errors $\{0°, -0.13°, 0°\}$. The equations of Table 2 give the spot pattern for $\{0°, -0.13°, 0°\}$ shown in FIG. 9B as if it were still a tool. Notice that the spot pattern has compressed into two apparent spots, each containing three reflected spots. The molded cube corners being part of a tilted plastic lens, produces a modification of this pattern. Refraction at the lens front surface stretches or elongates, more vertically than horizontally, the spot pattern. The x values from Table 2 must be multiplied by n, the refractive index of the plastic, and the y values from Table 2 must be multiplied by $$\frac{\sqrt{n^2 - \cos^2\theta}}{\sin\theta}$$

where θ is the angle between the marker face 18 and the ground 24. FIG. 9C shows the stretched spot pattern from an n=1.49 acrylic lens, having slope θ=30° to the ground. FIG. 9D shows the doubling of the spot pattern of FIG. 9C as would result by including mirror image cubes in the tool. The pattern of FIG. 9D is not achievable by means of dihedral errors on a single cube corner.

Figure 12:
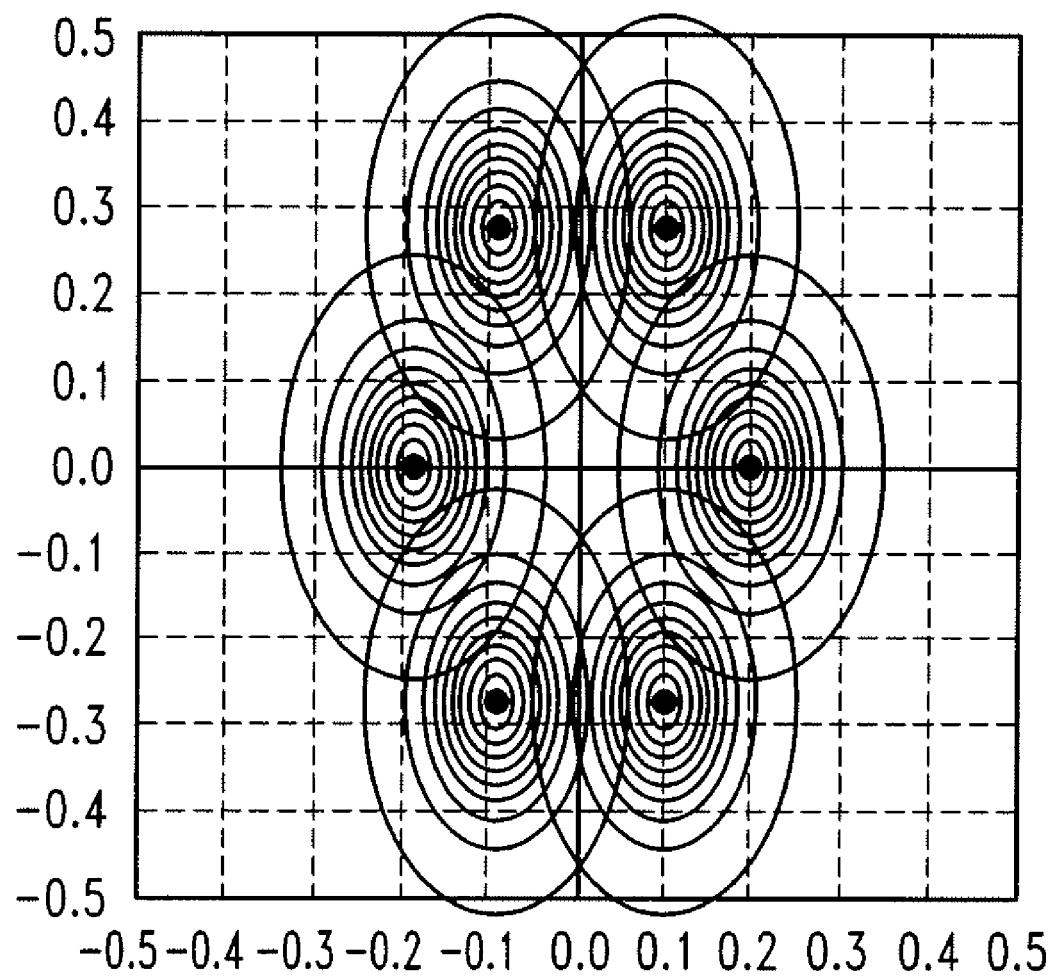
FIG. 12 illustrates the expected spreading of a point pattern into a light intensity pattern by high quality injection molding.

FIG. 12 illustrates the light intensity which might be expected corresponding to a certain point pattern of a well-molded acrylic road marker lens of the prior art. For this illustration, the molded dihedral errors were $\{0.04°, 0.04°, 0.04°\}$. The hexagonal spot pattern is as given by the Table 2 expressions and then stretched 1.49× horizontally and 2.425× vertically to account for refraction at the 30° sloped front face. Each point is shown spreading into an approximately Gaussian pattern, again with the proportional stretching, characteristic of high quality injection molding. The successive contours around each spot indicate 10%, 20%, etc. of the intensity at the peak.

For most cube designs the six mounds contain equal light. The light mounds add to a lumpy ring pattern for this retroreflector. A spot pattern is an abstraction from an actual light pattern. If the cubes are macrocubes, and if they are closely agreeing in their aberrations, and if their faces are highly flat, then the spot pattern is clearly visible in the light pattern. In other cases it might be possible to infer a spot pattern from the light pattern. In yet other cases it is not possible to infer the spot pattern from the light pattern. Spot patterns from injection molded macrocube retroreflectors must be understood as an idealization.

Figure 17:
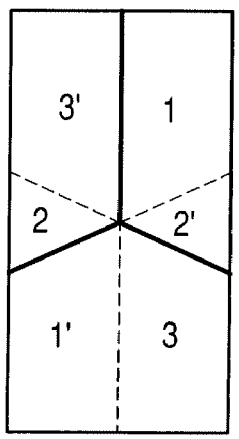
FIG. 17 illustrates a cube corner design that produces spots with definitely unequal light content.

It is also possible to design cube corner elements in which the quantity of light corresponding to the different spots is definitely unequal. FIG. 17 illustrates the q view of a rectangular cube corner in solid lines. Dashed lines segment the cube corner into the six areas which catch light for the corresponding six spots 1-3', labeled according to Table 2. Spots 2 and 2' receive a decreasing fraction of the total light as the rectangle is narrowed. When using such cube corner elements, wherein four of the six spots contain almost the whole energy, application of the present invention is simplified. The positions of spots 2 and 2' in the spot pattern have reduced importance. For the cube corners illustrated in FIG. 17, each of spots 2 and 2' carry approximately one-fourth the energy of each of the other four spots. Making the rectangle shape less tall causes each of spots 2 and 2' to carry more, for example one-half, the energy of each of the other four spots.

The descriptions of this invention presume that the molded cubes that were intended to be alike have mean dihedral aberration $\{e_1, e_2, e_3\}$. To this mean dihedral aberration there corresponds a spot pattern. The actual collection of molded cubes intended to be alike are not perfectly alike. The actual molded cubes have different $e_1$, $e_2$, $e_3$ from the mean values, and each could be said to have a different spot pattern from that associated with the mean dihedral aberration. Also the actual molded cubes may have imperfect face flatness. Even the front surface of the lens may have significant local unflatness. These deviations can be understood as producing a light mound in place of a spot.

This approach is also applicable to microcubes. With microcubes, the methods of plastic forming, such as embossing and casting, need to be more accurate than injection molding if only because unsharpness of edges would result in great loss of optical efficiency. With microcubes the formed cubes intended to be similarly aberrated are very nearly so and faces intended to be flat are very nearly so. Diffraction is the main source of deviation from the expected spot pattern, and while diffraction does not function as a similar spreading of each of the spots, unmetallized microcubes with active apertures at least about 200 microns in diameter and metallized microcubes with active apertures at least about 150 microns in diameter exhibit a calculated spot pattern that is an adequate skeletal indicator of the realized light pattern. The active aperture of a cube corner is that portion of the full shape of the cube corner which, for a particular Beta and Omega, retroreflects. How diffraction phenomena influence the geometric aberrations is well known from the optical arts of image forming lenses.

Microcubes are ill suited for experimentation, but mathematical modeling that takes into account aberration with diffraction for microcube corner reflection can be based on the principles contained in Yoder, op cit, and E. R. Peck, "Polarization Properties of Corner Reflectors and Cavities," *Journal of the Optical Society of America*, Volume 52, Number 3 (March 1962). Such modeling illustrates microcubes to be successful realizations of the invention, because the diffraction from unmetallized microcubes with active apertures at least about 200 microns in diameter and metallized microcubes with active apertures at least about 150 microns in diameter is sufficiently small to allow gradients in the light pattern about as steep as the best injection molding of macrocubes allows and microcubes this size have no significant diffraction light peak at the center of the pattern.

When the molding transform of different parts of the same lens varies, it is useful to study the light pattern from each of the different parts of the lens.

Cube corner elements may also be made by casting, embossing, or other suitable conventional methods in which the dihedral angle errors of the resulting cube corner elements may be controlled to provide the desired limited retroreflectance range.

Figure 11:
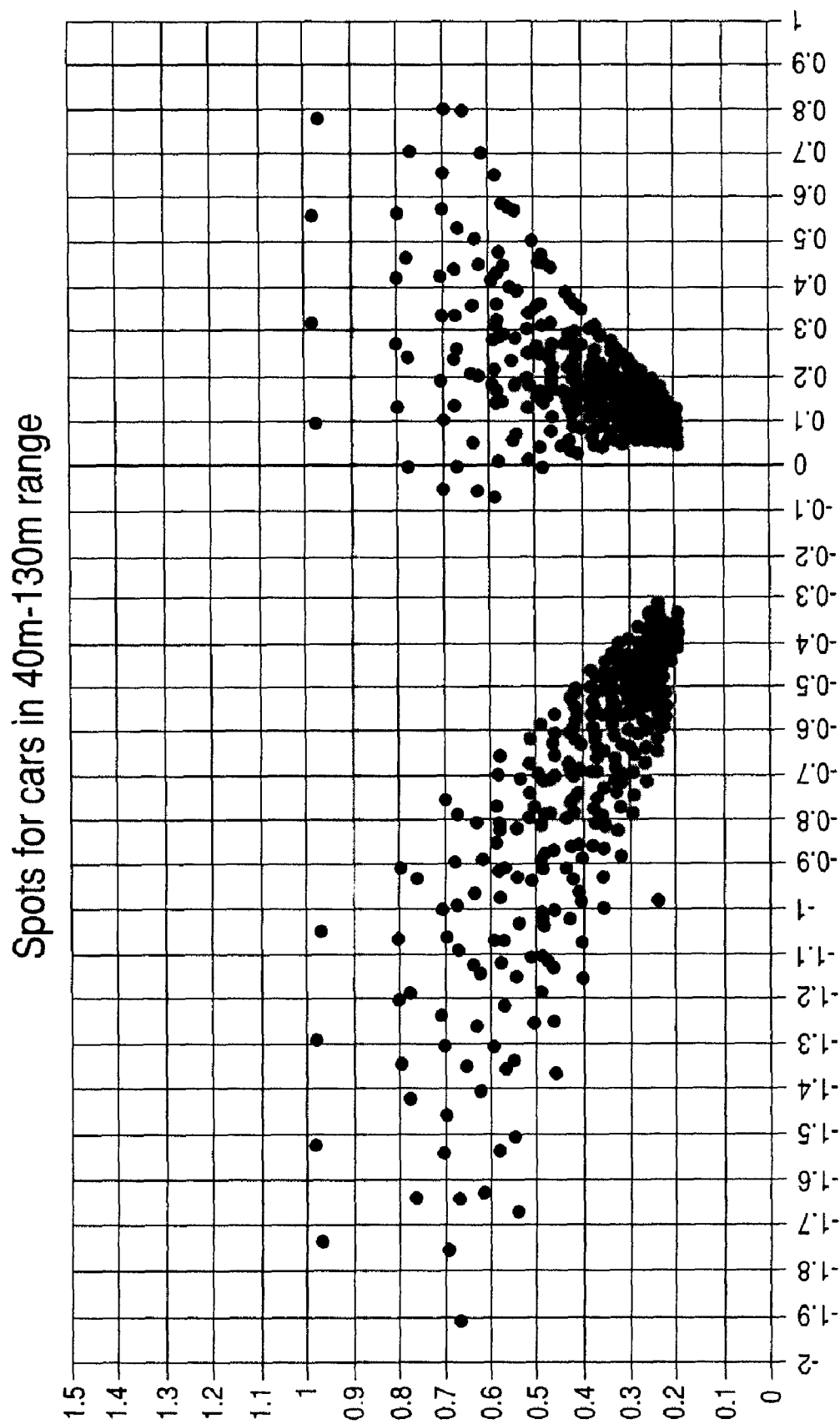
FIG. 11 illustrates the spots corresponding to passenger car observation in the distance range 40 m to 130 m. Imagine that you are behind the left headlamp viewing the retroreflector. For a reflection to reach the car driver it must diverge by an amount, and in a direction shown by the swarm of points on the right side of the figure. Similarly for the right headlamp and the swarm of points on the left side of the figure.

FIG. 11 illustrates the spots corresponding to passenger car observation in the distance range 40 m to 130 m. For a reflection to reach the car driver viewing the retroreflector from behind the left headlamp, the reflection must diverge in a direction shown by the swarm of points on the right side of the Figure. Similarly for the right headlamp and the swarm of points on the left side of the figure. For FIG. 11, seven different passenger car geometries were considered, and road markers were considered on both sides of the driving lane and one lane farther left and right. The asymmetrical shape of FIG. 11 results from the driver sitting left of center in the car.

Figure 13A:
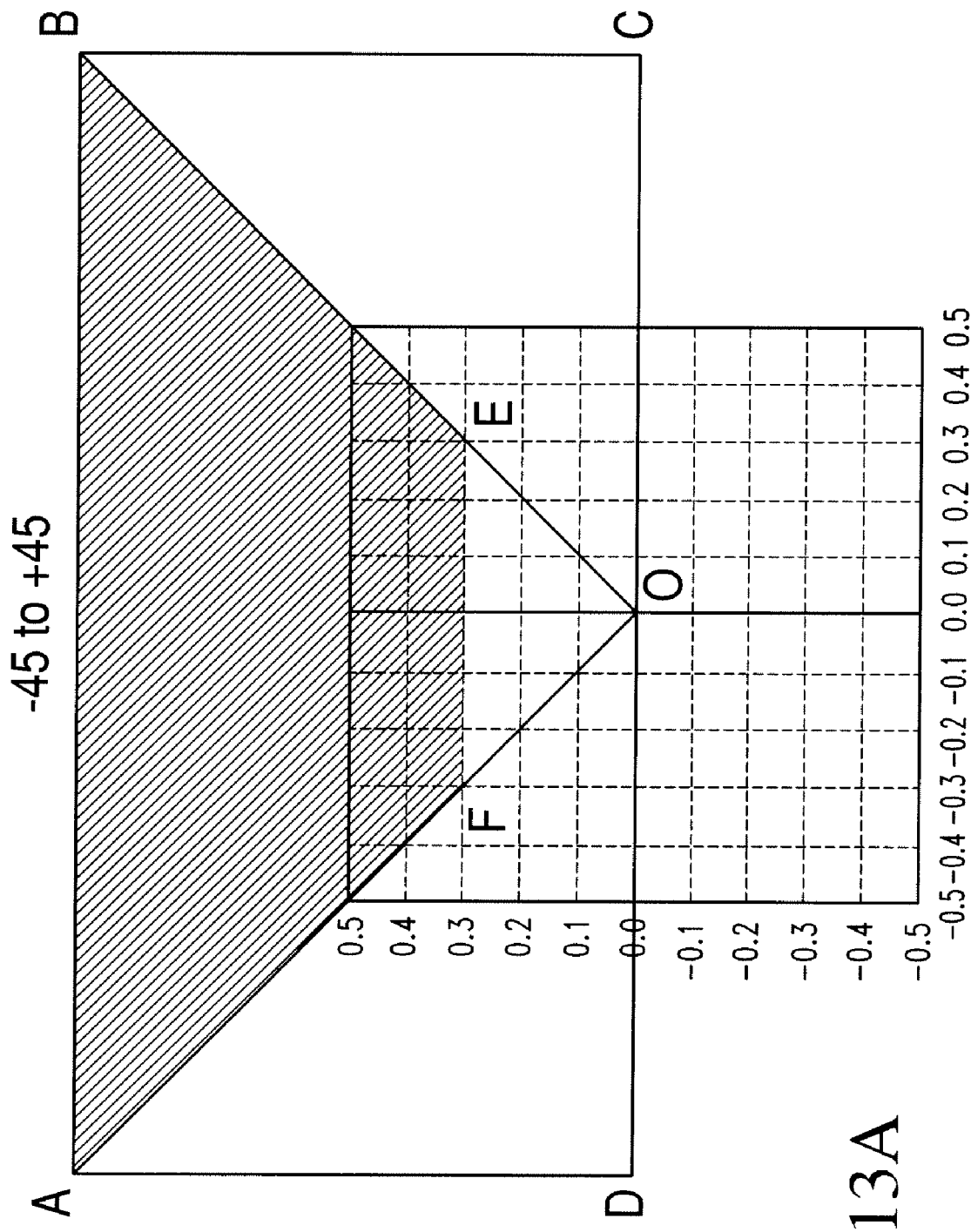
FIGS. 13A and B illustrate possible ranges for desirable spot patterns.

The pattern illustrated in FIG. 13A, corresponding to the International Functional Coefficient of Luminous Intensity and the International Visibility Index, has been proposed to bridge differences between those countries where vehicle drivers sit left of center (such as the USA) and countries where vehicle drivers sit right of center (such as the UK). More than ¼ of the world's population are in countries where vehicle drivers sit right of center (e.g., India, Japan, UK.) FIG. 13A shows the pattern of retroreflection divided into regions. The shaded trapezoidal region ABEF is where the pattern should concentrate its intensity. The triangular region FEO is where the pattern should be weak in order to limit long distance visibility. Additional triangular regions ODA and OBC should also be weak in order to conserve light for region FEO.

The regions are defined by upper and lower vertical limits. In FIG. 13A, the range is 0.3 deg to 1.0 deg.

The shaded region ABEF is defined by the two inequalities:

$$-45° \leq \epsilon \leq 45°$$

$$0.3° \leq \alpha \cos \epsilon \leq 1.0°\text{ This region is designated "}I(0.3°; 1.0°)\text{"}.$$

The small triangular region is defined by the two inequalities.

$$-45° \leq \epsilon \leq 45°$$

$$0° \leq \alpha \cos \epsilon \leq 0.3°$$

This region is designated "I(0°;0.3°)"

The larger triangle on the left is defined by $$-90° \leq \epsilon \leq -45°$$

$$0° \leq \alpha \cos \epsilon \leq 1.0°$$

The larger triangle on the right is defined by $$45° \leq \epsilon \leq 90°$$

$$0° \leq \alpha \cos \epsilon \leq 1.0°$$

The union of these two triangular regions is designated "I(1.0°)".

One result of the present invention is to minimize the $R_I$ content within the region I(0°; 0.3°) while achieving a large $R_I$ content within the region I(0.3°;1.0°), which requires keeping the $R_I$ content within region I(1.0°) small. The choice of demarcation at 0.3° is merely exemplary as falling between a chosen "too far" point and a chosen "far enough" point. The choice of limitation to 1.0° is also merely exemplary of a chosen "close enough" point. For the marker of Example 1, I(0°; 0.3°)=45, I(0.3°;1.0°)=219 and I(1.0°)=84

Figure 13B:
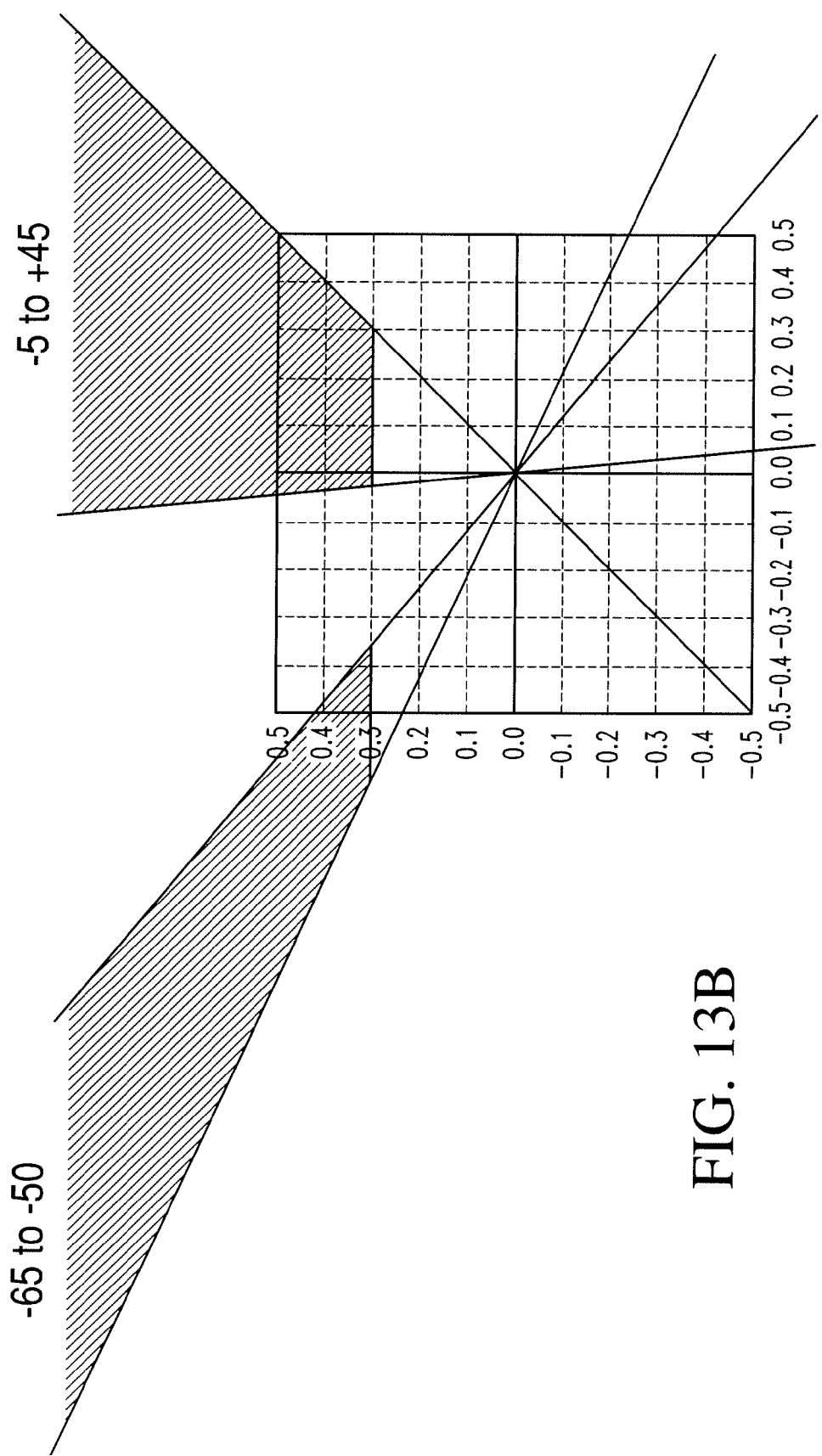

Markers can also be designed with an asymmetrical pattern of retroreflection for best functioning in one or the other kind of country. For example, FIG. 13B illustrates a desirable visibility profile of retroreflected light for countries in which the drivers sit left of center, as also shown in FIG. 11. The shaded region in FIG. 13B is in two trapezoidal parts, the left part is defined by the two inequalities:

$$-65° \leq \epsilon \leq -50°$$

$$0.3° \leq \alpha \cos \epsilon \leq 1.0°$$

The right part is defined by the two inequalities:

$$-5° \leq \epsilon \leq 45°$$

$$0.3° \leq \alpha \cos \epsilon \leq 1.0°$$

This two-part region is designated "A(0.3°;1.0°)".

The region in FIG. 13B corresponding to long distance visibility is in two triangular parts. They are not indicated with shading in the figure. The left part is defined by the two inequalities:

$$-65° \leq \epsilon \leq -50°$$

$$\alpha \cos \epsilon \leq 0.3°$$

The right part is defined by the two inequalities:

$$-5° \leq \epsilon \leq 45°$$

$\alpha \cos \epsilon \leq 0.3°$.

This two-part region is designated "A(0°;0.3°)".

One result of the present invention is to minimize the $R_I$ content within the region A(0°;0.3°) while achieving a large $R_I$ content within the region A(0.3°;1.0°). The choice of demarcation at 0.3° is merely exemplary as falling between a chosen "too far" point and a chosen "far enough" point. The choice of limitation to 1.0° is also merely exemplary of a chosen "close enough" point.

The $R_I$ content of a region R of defined $\alpha$ and $\epsilon$ is computed as an integral of the $R_I$ over that region. Formally, $R_I$ content of $$R = \iint_R R_I(\alpha, \varepsilon) d\alpha d\varepsilon.$$

As this formula is used herein, the angles $\alpha$ and $\epsilon$ are measured in degrees, and the $R_I$ is measured at 0 degrees horizontal entrance angle in units of mcd/lx. Because $R_I(\alpha,\epsilon)$ is an empirical function, the integration will be a numerical approximation based on measurements of $R_I$ made at many ($\alpha,\epsilon$) points within the region R. The approximation can be made as exact as desired by increasing the number of measurements.

Example 2, below, satisfies the sit-on-left criterion better than the international criterion. Mirror image versions of Example 2 would correspondingly satisfy the sit-on-right criterion.

To make a retroreflector in accordance with the present invention, the desired light pattern is identified, such as in FIG. 13B. With macro-cube corners, an achievable spot pattern, or combination of spot patterns which approximates the desired light pattern is then determined. The process of finding achievable spot patterns requires exercise of the expressions in Table 2 together with the stretch factors described above. This can be rendered in a calculating spreadsheet. Alternatively a computer program can be written which finds the nearest achievable spot pattern to any conjectured spot pattern.

With microcubes the spot pattern is only a crude indicator of the light pattern. Diffraction phenomena can strongly influence the geometric aberrations, as is well known for all optical systems While microcubes are not well suited for experimentation, a calculational approach illustrates that the range of retroreflectance may be limited in the manner described herein. Good diffraction plus aberration mathematical modeling of microcube corner reflection is possible using principles contained in the papers of Yoder and Peck, cited above.

The light pattern from a retroreflector may be measured with conventional retroreflector photometry. The photometer may read intensity at several hundred points, which data may then be assembled into a picture. The Application angle system described in CIE Pub. 54.2, "Retroreflection: Definition and Measurement", is practical, and is incorporated herein by reference. First the direction of illumination is chosen, by fixing two angles termed $\beta$ and $\omega_s$ in that system. Then the two angles termed $\alpha$ and $\epsilon$ in that system are systematically varied, and the coefficient of retroreflected luminous intensity measured at each angle combination. A picture is formed in polar coordinates using $\alpha$ as the radial dimension and $\epsilon$ as the polar angle.

The size of the cube corner elements must be taken into account. Commonly injection molded macro-sized cube corners for road markers have projected areas generally in the range 0.6 sq. mm to 12 sq. mm. Micro-sized cube corners for road markers have projected areas generally less than 0.05 sq. mm. Projected area is used to denote the area as viewed straight towards the road marker as if from a faraway vehicle. The slope angle $\theta$ of the marker face causes the cube corners to look less tall than they would were they viewed axially from their rears or from within the lens. The shortening factor equals $$\frac{n\sin\theta}{\sqrt{n^2 - \cos^2\theta}}$$

where n is the refractive index of the lens. FIG. 1 shows this as the distance between rays p being less than the distance between rays q.

Light diffraction by macro-sized cube corners is too slight to affect retroreflective performance. Thus a geometrical appraisal of the aberrations, including dihedral angle errors, is sufficient. When the macro-cube corner faces are molded to unusual flatness, or when the many macro-cube corners comprising a retroreflective marker are molded to unusual similarity, the reflected light pattern is six discrete spots. This pattern is functionally undesirable. For such molding conditions, the tool should be made with cubes not all alike. The individual molded macro-cube corners will produce six light spots, satisfying the pattern efficiency condition, while the sum of the many cube corners' patterns will be a light swath, also satisfying the pattern efficiency condition, as desirable. Execution of the inventive design requires a delicate control of the spottiness of light pattern. Patterns that are too blurred will not achieve the desired range cutoff. Patterns that are too pointlike will not function for observers. Intentional variety in the macro-cube corners in the tool is the pointillistic solution to this dilemma.

Likewise when the close distances visibility must be enhanced, two or more levels of cube aberration will be included in the tool. Extending Example 1, below, a first subset of cubes in the tool will have the described errors {+0.04°, -0.09°, +0.07°} and mold to {0.00°, -0.13°, 0.00°}; a second subset of cubes in the tool will have errors {+0.04°, -0.22°, +0.07°} and mold to {0.00°, -0.26°, 0.00°}. In this example the second subset of cubes has a molded spot pattern which is a two times expansion of the first subset of cubes. Accordingly the molded dihedral errors are doubled. But the tool dihedral errors in the two subsets is not doubled. This is because the transformation between tool and molded part is additive and fixed.

Introduction of dihedral angle error is not the only way to effect light patterns satisfying the criteria of this invention. The cube faces can be curved or faceted. Holographic light diffusers can be incorporated into the lens. Various aberrating means can also be used in combination.

EXAMPLE 1

Figure 14A:
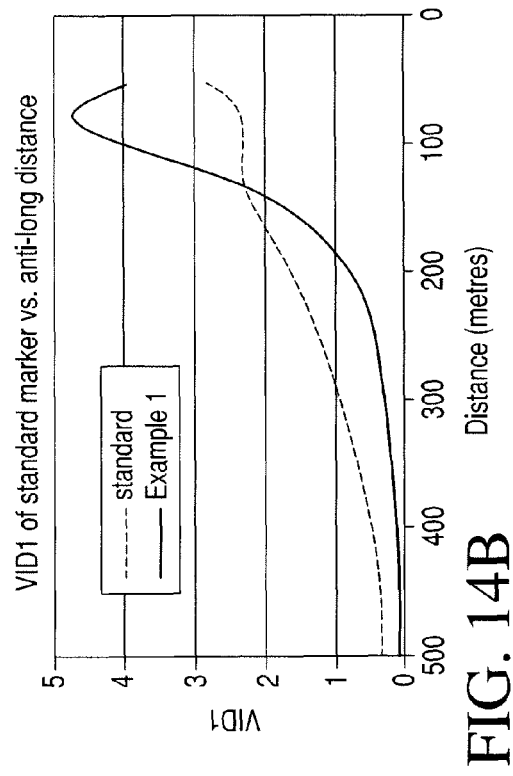
FIGS. 14A-D are graphs of the performance of the standard marker and a marker made in accordance with Example 1 of the present invention.

A retroreflective article in accordance with the present invention can be made with cube corner elements 22, oriented as in FIG. 4A or 4B, that direct the retroreflected intensity away from observation angles between 0 and 0.2 degrees. In this case, 0.2 degrees is the observation angle selected to represent "too far"; 0.4 degrees is selected to represent "far enough"; 1.0 degree is selected to represent "close enough". A tool having dihedral angle errors of about +0.04 degrees, about -0.09 degrees, and about +0.07 degrees can be used to mold acrylic resin in a process that transforms dihedral angle errors by about −0.04 degrees, about −0.04 degrees, and about −0.07 degrees, respectively, to produce cube corner elements 22 having idealized dihedral angle errors of about 0 degrees, about −0.13 degrees, and about 0 degrees. The tool used to produce this cube corner element has the retroreflected spot pattern of FIG. 9A. The molded cube corner element in a raised pavement marker having a 30 degree sloping front, which is the angle of the lens assembly with respect to the horizontal, has the idealized spot pattern of FIG. 9C. The pattern of FIG. 9C avoids reflected light to observation angles between 0 and 0.2 degrees. FIGS. 14A and 14C illustrate the predicted functional $R_I$ values of the raised pavement marker with reflected light from a light source at 0 degrees horizontal entrance angle at various distances from a raised pavement marker made in accordance with this example. The observation angle is on the x axis and either FRO1 or FRO2 is on the y axis. The predicted functional $R_I$, in mcd/lx, of a marker in accordance with this example of the present invention is shown compared with the predicted functional $R_I$ of the standard marker for observation angles up to 1.0 degree.

The predicted functional coefficients of luminous intensity at the various observation angles for a raised pavement marker with cube corner elements made in accordance with this example compared with that of the standard marker, as illustrated in FIGS. 14A and 14C, are given numerically in Tables 3 and 4:

TABLE 3

International Functional Coefficient of Luminous Intensity Comparison for Example 1

| Observation angle (degrees) | Distance (metres) | FRO1 and FRD1 for example 1 marker | FRO1 and FRD1 for the standard marker | example 1 vs. the standard marker |
|---|---|---|---|---|
| 0 | infinity | 336 | 2112 | 16% |
| 0.1 | 500 | 356 | 1770 | 20% |
| 0.2 | 250 | 407 | 1207 | 34% |
| 0.3 | 167 | 455 | 710 | 64% |
| 0.4 | 125 | 448 | 397 | 113% |
| 0.5 | 100 | 381 | 228 | 167% |
| 0.6 | 83 | 288 | 147 | 196% |
| 0.7 | 71 | 202 | 101 | 200% |
| 0.8 | 63 | 138 | 77 | 179% |
| 0.9 | 56 | 96 | 61 | 158% |
| 1.0 | 50 | 70 | 49 | 141% |

TABLE 4

Asymmetrical Functional Coefficient of Luminous Intensity Comparison for Example 1

| Observation angle (degrees) | Distance (metres) | FRO2 and FRD2 for example 1 marker | FRO2 and FRD2 for the standard marker | example 1 vs. the standard marker |
|---|---|---|---|---|
| 0 | infinity | 336 | 2112 | 16% |
| 0.1 | 500 | 349 | 1765 | 20% |
| 0.2 | 250 | 398 | 1195 | 33% |
| 0.3 | 167 | 482 | 694 | 69% |
| 0.4 | 125 | 565 | 383 | 148% |
| 0.5 | 100 | 577 | 217 | 266% |
| 0.6 | 83 | 474 | 138 | 344% |
| 0.7 | 71 | 337 | 97 | 348% |
| 0.8 | 63 | 215 | 74 | 290% |
| 0.9 | 56 | 133 | 59 | 226% |
| 1.0 | 50 | 85 | 48 | 179% |

At extreme distance, the passenger vehicle driver would see the marker in accordance with this example of the present invention as 16% as bright as the standard marker.

Figure 14B:
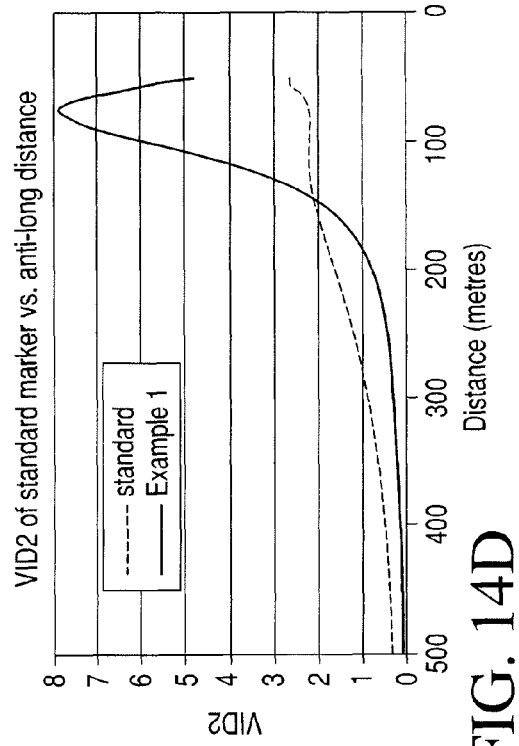
Figure 14C:
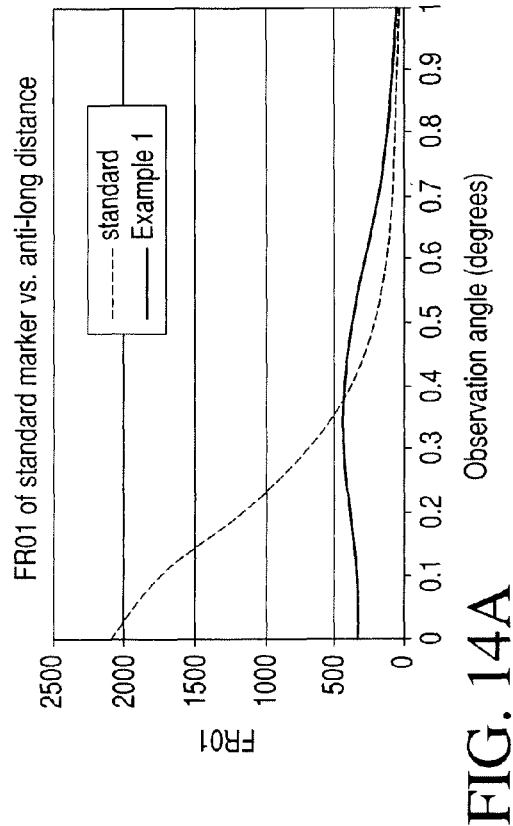
Figure 14D:
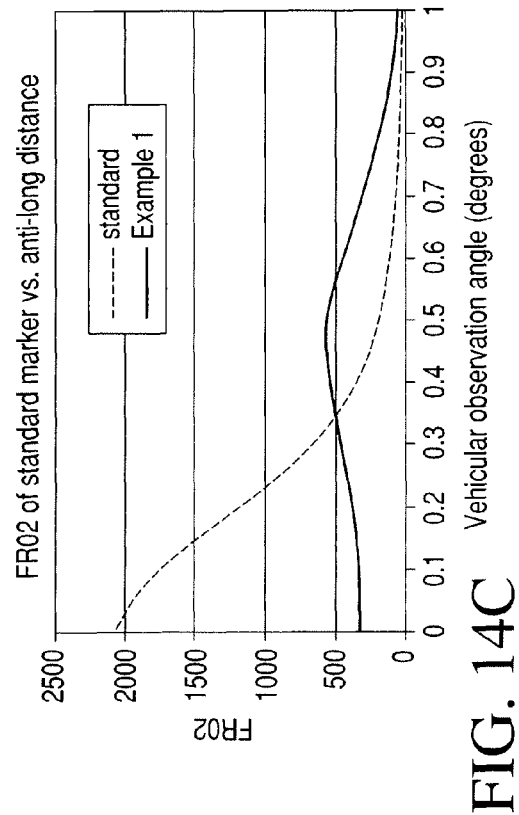

The predicted Visibility Indices at the distances for a raised pavement marker with cube corner elements made in accordance with this example compared with that of the standard marker, as illustrated in FIGS. 14B and D are given numerically in Tables 5 and 6:

TABLE 5

International Visibility Index Comparison for Example 1

| Observation angle (degrees) | Distance (metres) | VIO1 and VID1 for example 1 marker | VIO1 and VID1 for the standard marker | example 1 vs. the standard marker |
|---|---|---|---|---|
| 0 | infinity | 0.00 | 0.00 | |
| 0.1 | 500 | 0.06 | 0.32 | 20% |
| 0.2 | 250 | 0.41 | 1.22 | 34% |
| 0.3 | 167 | 1.27 | 1.98 | 64% |
| 0.4 | 125 | 2.57 | 2.27 | 113% |
| 0.5 | 100 | 3.81 | 2.28 | 167% |
| 0.6 | 83 | 4.54 | 2.31 | 196% |
| 0.7 | 71 | 4.69 | 2.35 | 200% |
| 0.8 | 63 | 4.47 | 2.49 | 179% |
| 0.9 | 56 | 4.18 | 2.65 | 158% |
| 1.0 | 50 | 3.93 | 2.79 | 141% |

TABLE 6

Asymmetrical Visibility Index Comparison for Example 1

| Observation angle (degrees) | Distance (metres) | VIO2 and VID2 for example 1 marker | VIO2 and VID2 for the standard marker | example 1 vs. the standard marker |
|---|---|---|---|---|
| 0 | infinity | 0.00 | 0.00 | |
| 0.1 | 500 | 0.06 | 0.32 | 20% |
| 0.2 | 250 | 0.40 | 1.21 | 33% |
| 0.3 | 167 | 1.34 | 1.94 | 69% |
| 0.4 | 125 | 3.23 | 2.19 | 148% |
| 0.5 | 100 | 5.77 | 2.17 | 266% |
| 0.6 | 83 | 7.48 | 2.18 | 344% |
| 0.7 | 71 | 7.82 | 2.25 | 348% |
| 0.8 | 63 | 6.97 | 2.40 | 290% |
| 0.9 | 56 | 5.77 | 2.55 | 226% |
| 1.0 | 50 | 4.81 | 2.69 | 179% |

The FRO2 of the marker of this example is no more than about 400 mcd/lx at observation angles of about 0.2 degrees or less and is at least about 550 mcd/lx at observation angle 0.4 degrees and continuing to be above about 85 mcd/lx to about 1.0 degrees. The FRO2 of the marker in accordance with this example is significantly less than that of the standard marker for observation angles less than about 0.27 degrees and significantly greater than that of the standard marker for observation angles between about 0.43 degrees about 1.0 degrees. By "significantly" is meant by a factor of at least 1.8.

The $R_I$ content of region A(0°;0.2°) for the marker of this example equals just 17. For comparison, the $R_I$ content of region A(0°;0.2°) for the standard marker equals 55. The $R_I$ content of region A(0.4°; 1.0°) for the marker of this example equals 154. For comparison, the $R_I$ content of region A(0.4°; 1.0°) for the standard marker equals only 60. The standard marker puts approximately equal amounts of light into the undesired and the desired regions, while the inventive marker of this example puts approximately 9 times as much light into the desired region as the undesired region. For these calculations of $R_I$ content, 120 measurement points were taken within the region A (0°;0.2°) and 1979 measurement points were taken within the region A(0.4°;1.0°).

EXAMPLE 2

Figure 15A:
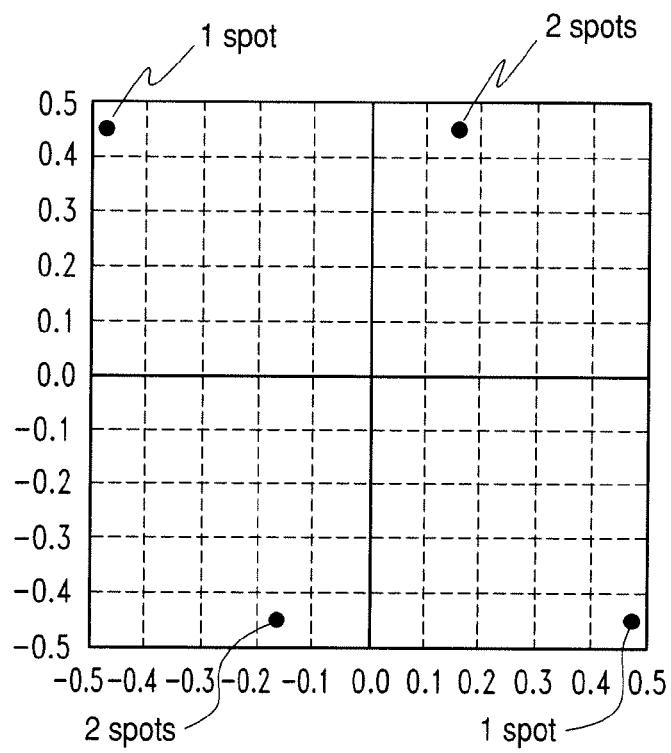
FIGS. 15A and B illustrate the spot patterns in accordance with embodiments of the present invention.
Figure 15B:
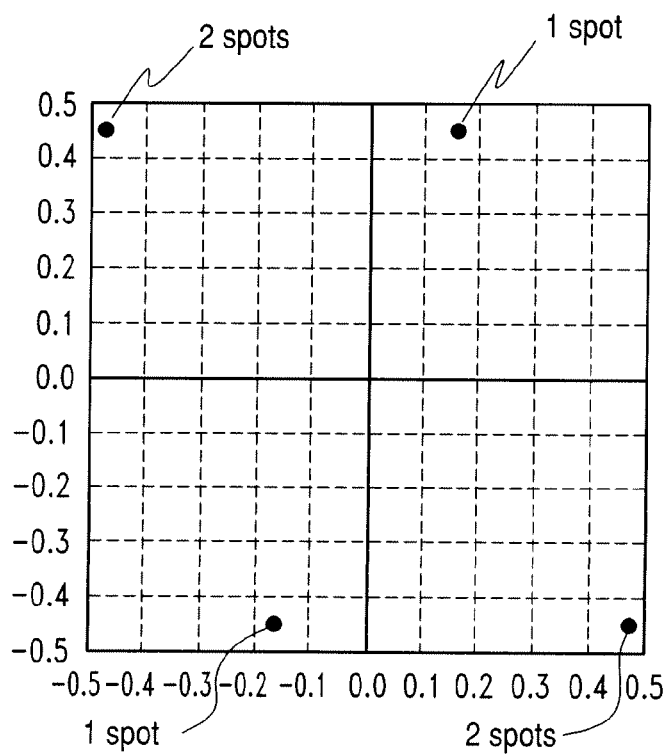

This example will satisfy the driver-on-left criterion instead of the international criterion. The molded cubes of Example 1 having dihedral angle errors {0, −0.13, 0} are called A-cubes. Molded cubes having dihedral angle errors {−0.13, 0, +0.13} are called B-cubes. Molded cubes having dihedral angle errors {+0.13, 0, +0.13} are called C-cubes. FIG. 9C shows the spot patterns from the A-cubes. FIG. 15A shows the spot pattern from the B-cubes. FIG. 15B shows the spot pattern from the C-cubes. The B-cube puts two spots where the C-cube corner puts one, and vice versa. The B-cube pattern and C-cube pattern partly coincide with the pattern from the A-cubes.

If the molding transformation is {−0.04, −0.04, −0.07} then in the tool, A-cubes have dihedral angle errors {+0.04, −0.09, +0.07}, B-cubes have dihedral angle errors {−0.09, +0.04, +0.20} and C-cubes have dihedral angle errors {+0.17, +0.04, +0.20}.

Either A-cubes, B-cubes, or C-cubes will satisfy the driver-on-left criterion. The A-cubes will reflect the vehicle's left headlamp to a driver, but their reflection of the right headlamp will not be observed. The B-cubes will reflect the vehicle's left and right headlamps to the driver, but with reduced efficiency. That is, in FIG. 15A, when reflecting the left headlamp, the two spots in the upper right quadrant will return to the observer, but the others will not, and when reflecting the right headlamp the one spot in the upper left quadrant will return to the observer, but the others will not. FIG. 15B favors the right headlight.

This exemplifies how every known retroreflector suffers two inefficiencies, each of a factor of two. First the symmetry of the light pattern results in half the reflected light aiming below the headlight, where it certainly won't be observed. Second it is impossible to tailor a retroreflector to produce more intensity from the two vehicle headlights than from just one. If the retroreflector efficiently reflects light from one headlight to the observer, then it fails to reflect the other headlight to the observer.

Relying wholly on the left headlight, a road marker lens of A-cubes produces as great intensity for the left-of-center driver as lenses with B-cubes or C-cubes. However this defeats the redundancy of the vehicle's two headlights. Comparison of FIG. 11 with FIGS. 15A-B and FIG. 12 shows that it is difficult to achieve efficient reflection of the right headlight to the left-of-center driver. This is because the rotation angle shown to the left in FIG. 11 is large and the mounding expected from molding in FIG. 12 aligns vertically, rather than at the strong slant. For this reason a lens of B-cubes might be slightly less intense to the left-of-center driver than a lens of A-cubes, and a lens of C-cubes of further reduced intensity. Lenses comprising a mixture of A-cubes and B-cubes will have behavior midway between them. Lenses comprising a mixture of B-cubes and C-cubes will have behavior midway between them.

It is surprising that the left headlamp does not necessarily provide the major part of the retoreflected intensity. Such is generally the case for lenses where the retroflectance is a falling function of observation angle, but not for some of the range limited markers of the present invention and the spot patterns therefrom. It is also surprising that, in the devices of the present invention, retroreflectance is more nearly varying in rectangular coordinates x,y, which are horizontal and vertical components of observation angle. This is because the cube corners spot pattern is not especially radial and the refractive stretch is mostly in the y direction. Conventionally, it is considered that retroreflectance is a polar quantity, varying especially with observation angle, the radial direction from the center of FIGS. 9 and 15.

EXAMPLE 3

Figure 10:
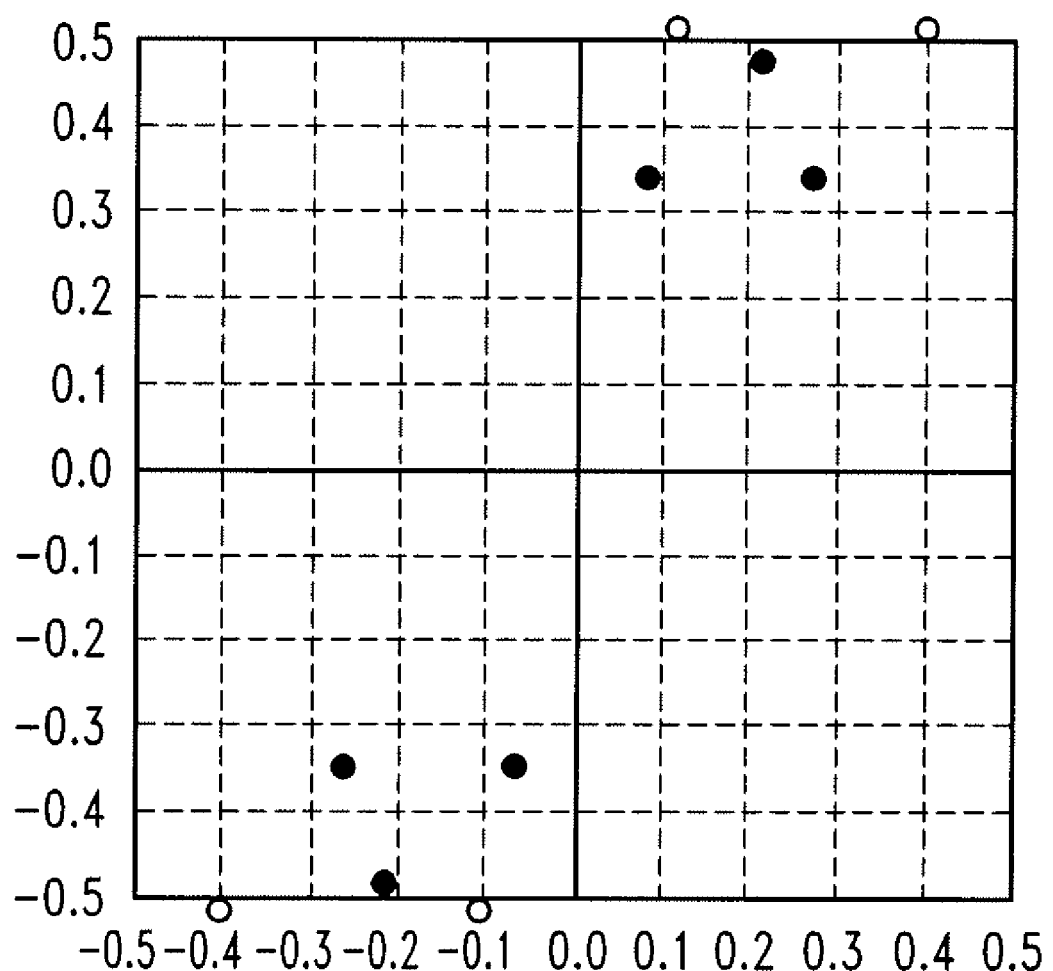
FIG. 10 illustrates the addition of two spot patterns.

This example has an extended retroreflection pattern, by means of mixing two spot patterns of different scales. FIG. 10 shows the addition of the spot pattern, shown with solid dots, corresponding to dihedral errors {−0.02°, 0.12°, 0.04°} to the spot pattern, shown with hollow dots, corresponding to dihedral errors {−0.03°, 0.18°, 0.06°}. The second pattern is exactly 1.5× the size of the first. Note that the cubes in the tool used to make these two patterns will not themselves exhibit patterns differing in scale. For example, if the molding transformation is {−0.04°, −0.04°, −0.07°}, then the cubes in the tools will be {0.02°, 0.16°, 0.11°} and {0.01°, 0.22°, 0.13°} which are not proportionate.

Combination of patterns of different size accommodates the variation with road distance of the positions of the of the observer relative to the headlights as shown in FIG. 11. A lens comprised of macrocubes will have between about 100 and about 300 cube corners, allowing much flexibility of mixtures of aberrated types.

Supposing that equal numbers of the two cube types were used in this example marker, The $R_I$ content of region A(0°; 0.3°) for the marker of this example equals just 33. For comparison, the $R_I$ content of region A(0°;0.3°) for the standard marker equals 82. The $R_I$ content of region A(0.3°;1.0°) for the marker of this example equals 175. For comparison, the $R_I$ content of region A(0.3°;1.0°) for the standard marker equals only 82. The standard marker puts equal amounts of light into the undesired the desired regions, while the inventive marker of this example puts approximately 5.3 times as much light into the desired region as the undesired region. Note that this comparison differs from that described for Example 1 because there is no observation angle buffer between the desired and undesired regions.

Figure 16:
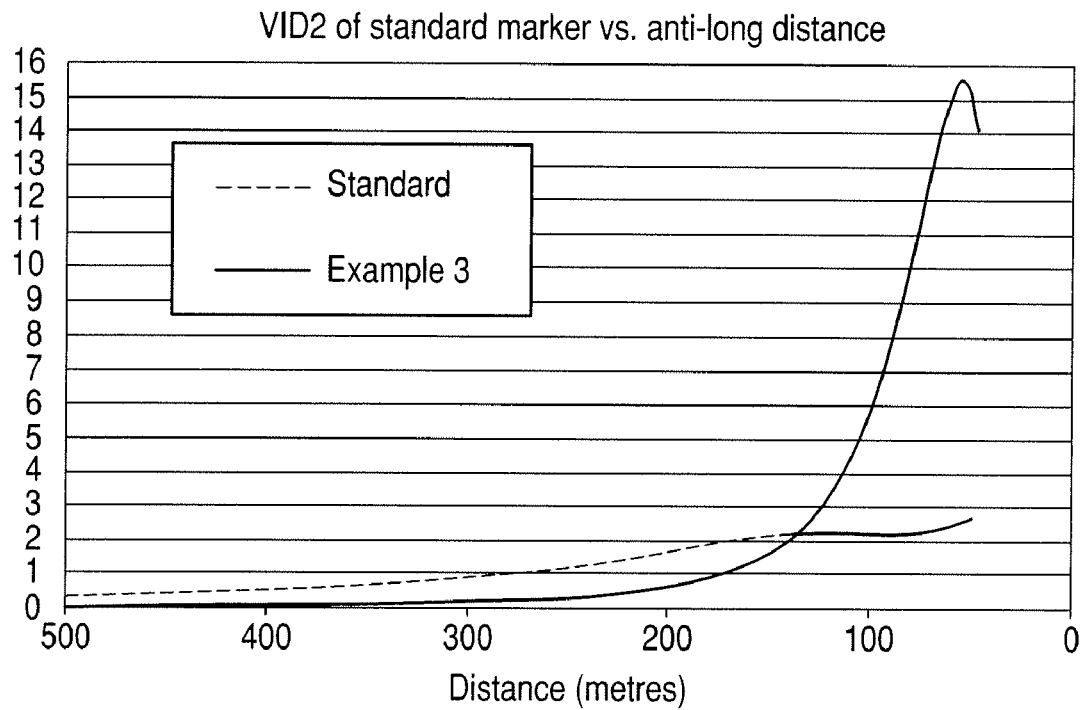
FIG. 16 is a graph of the VI2 performance of the standard marker and a marker made in accordance with Example 3 of the present invention.

FIG. 16 graphs the VID2 for the Example 3 marker versus the standard marker.

EXAMPLE 4

This example differs from the first three in pertaining to cube corners of the second kind, represented in FIGS. 4C and 4D.

A retroreflective article in accordance with the present invention can be made with cube corner elements 22 that direct the retroreflected intensity away from observation angles between 0 and 0.3 degrees. In this case, 0.3 degrees is the selected first observation angle. The cube corner element dihedral angle errors would be about +0.04 degrees, about +0.04 degrees, and about +0.09 degrees.

It should not be expected that the dihedral angle shrinkages for this structure would be similar to those of Examples 2 or 3. The molding transformation must always be determined by experimentation.

In this example, about half of the cube corners are to be as shown in FIG. 4C, and half as shown in FIG. 4D. With rectangular cube corners this can be neatly achieved with contiguous pairs. With hexagonal cube corners the left half the marker lens can be FIG. 4C cubes and the right half of the marker lens FIG. 4D cubes, or vice versa. The two parts of FIG. 18 illustrate assemblies of hexagonal pins for the right half and the left half of the marker lens. Use of this cube corner element in a raised pavement marker having a 30 degree sloping front, which is the angle of the lens assembly with respect to the horizontal, will result in directing the retroreflected light away from the observation angles between 0 and 0.3 degrees in an idealized spot pattern similar to that of FIG. 7. A retroreflective article with cube corner elements 22 made in accordance with this example results in utilization of ⅗ of the retroreflected energy. If the cube corners of this example are to be made of acrylic and non-metallized then it is necessary that they be specially canted in order that both the FIG. 4A elements and the FIG. 4B elements achieve Total Internal Reflection for retroreflection to both plus and minus 20° horizontal entrance angle. For example, the pins can be assembled with their own edges in the direction q of FIG. 1, as is standard practice, but the cube corners on the pins would be tipped in such a way that dihedral edge for $e_3$ (in FIG. 4C or 4D) makes an angle to q which is larger than the angle that the dihedral edge for $e_1$ makes to q and the angle that the dihedral edge for $e_2$ makes to q. The amount of tipping necessary is approximately 1 deg. Use of higher refractive index material, such as polycarbonate, makes this special canting unnecessary.

While the present invention has been illustrated by the above description of embodiments, and while the embodiments have been described in some detail, it is not the intention of the applicants to restrict or in any way limit the scope of the invention to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicants' general or inventive concept.

I claim:

1. A tool comprised of aberrated cube corner elements for forming a retroreflective lens from a selected transparent material by a selected forming process comprising aberrated cube corner elements, the lens when tilted producing a pattern of retroreflectivity having an International Functional Coefficient of Luminous Intensity, FRO1, that is at a maximum value at an observation angle between about 0.2 deg and about 0.5 deg,
    wherein said cube corner elements of the tool have dihedral angle errors $e_1$, $e_2$, $e_3$ and wherein addends $T_1$, $T_2$, $T_3$ each having a value which is dependent upon said selected material and forming process are added to the respective dihedral angle errors $e_1$, $e_2$, $e_3$ as a result of a change in shape of said selected material during said forming process, and wherein said dihedral angle errors $e_1$, $e_2$, $e_3$ are selected such that the resulting dihedral angle errors $e_1+T_1$, $e_2+T_2$, $e_3+T_3$ characterize said lens which, when tilted, has an International Functional Coefficient of Luminous Intensity, FRO1, that is at a maximum value at an observation angle between about 0.2 deg and about 0.5 deg.

2. The tool of claim 1, wherein the absolute value of $e_3+T_3$ is no greater than about 0.03°, and the absolute value of one of $e_1+T_1$ and $e_2+T_2$ is no greater than about 0.03° and the absolute value of the other of $e_1+T_1$ and $e_2+T_2$ is greater than about 0.10°.

3. A tool comprised of aberrated cube corner elements for forming a retroreflective lens from a selected transparent material by a selected forming process comprising aberrated cube corner elements, the lens having a frontally projected area of between 8 sq. cm. and 12 sq. cm., and having an Asymmetrical Functional Coefficient of Luminous Intensity, FRO2, that is at a maximum value at an observation angle between about 0.3 deg and about 0.6 deg, the maximum value being at least 460 mcd/lx,
    wherein said retroreflective cube corner elements of the tool have dihedral angle errors $e_1$, $e_2$, $e_3$, and wherein addends $T_1$, $T_2$, $T_3$ each having a value which is dependent upon said selected material and forming process are added to the respective dihedral angle errors $e_1$, $e_2$, $e_3$ as a result of a change in shape of said selected material during forming, and wherein said dihedral angle errors $e_1$, $e_2$, $e_3$ are selected such that the resulting dihedral angle errors $e_1+T_1$, $e_2+T_2$, $e_3+T_3$ characterize said lens having a frontally projected area of between 8 sq. cm., and 12 sq. cm., and having an Asymmetrical Functional Coefficient of Luminous Intensity, FRO2, that is at a maximum value at an observation angle between about 0.3 deg and about 0.6 deg, the maximum value being at least 460 mcd/lx.

4. The tool of claim 3, wherein the absolute value of $e_3+T_3$ is no greater than about 0.03°, and the absolute value of one of $e_1+T_1$ and $e_2+T_2$ is no greater than about 0.03° and the absolute value of the other of $e_1+T_1$ and $e_2+T_2$ is greater than about 0.10°.

5. A tool comprised of aberrated cube corner elements for forming a retroreflective lens from a selected transparent material by a selected forming process comprising aberrated cube corner elements, the lens having a frontally projected area of X sq. cm., and having an Asymmetrical Functional Coefficient of Luminous Intensity, FRO2, at an observation angle of 0.2 deg that is no more than 60X mcd/lx, and an FRO2 at an observation angle of 0.4 deg that is no less than 40X mcd/lx,
    wherein said retroreflective cube corner elements of the tool have dihedral angle errors $e_1$, $e_2$, $e_3$, and wherein addends $T_1$, $T_2$, $T_3$ each having a value which is dependent upon said selected material and forming process are added to the respective dihedral angle errors $e_1$, $e_2$, $e_3$ as a result of a change in shape of said selected material during forming, and wherein said dihedral angle errors $e_1$, $e_2$, $e_3$ are selected such that the resulting dihedral angle errors $e_1+T_1$, $e_2+T_2$, $e_3+T_3$ characterize said lens having a frontally projected area of X sq. cm., and having an Asymmetrical Functional Coefficient of Luminous Intensity, FRO2, at an observation angle of 0.2 deg that is no more than 60X mcd/lx, and an FRO2 at an observation angle of 0.4 deg that is no less than 40X mcd/lx.

6. The tool of claim 5, wherein the absolute value of $e_3+T_3$ is no greater than about 0.03°, and the absolute value of one of $e_1+T_1$ and $e_2+T_2$ is no greater than about 0.03° and the absolute value of the other of $e_1+T_1$ and $e_2+T_2$ is greater than about 0.10°.

* * * * *